United States Patent
Roberdeaux

(10) Patent No.: US 9,936,679 B2
(45) Date of Patent: Apr. 10, 2018

(54) PET LEASH ACCESSORY ASSEMBLY

(71) Applicant: Drew A. Roberdeaux, Villa Hills, KY (US)

(72) Inventor: Drew A. Roberdeaux, Villa Hills, KY (US)

( * ) Notice: Subject to any disclaimer, the term of this patent is extended or adjusted under 35 U.S.C. 154(b) by 0 days.

(21) Appl. No.: 14/691,890

(22) Filed: Apr. 21, 2015

(65) Prior Publication Data
US 2015/0305310 A1 Oct. 29, 2015

Related U.S. Application Data

(60) Provisional application No. 61/983,000, filed on Apr. 23, 2014.

(51) Int. Cl.
A44B 18/00 (2006.01)
A01K 27/00 (2006.01)
F16B 2/08 (2006.01)

(52) U.S. Cl.
CPC ............ A01K 27/008 (2013.01); F16B 2/08 (2013.01)

(58) Field of Classification Search
CPC .... B65D 2313/02; B65D 63/10; B60P 7/0823
USPC ......... 24/130, 115 H, 306, 442, 16 R, 265 H
See application file for complete search history.

(56) References Cited

U.S. PATENT DOCUMENTS

| | | | | |
|---|---|---|---|---|
| 1,514,962 A | * | 11/1924 | Grimaldi | A45B 25/12 135/37 |
| 1,945,932 A | * | 2/1934 | Caley | A45D 2/18 132/247 |
| 3,279,008 A | * | 10/1966 | Wallach | A63C 11/021 24/16 PB |
| 3,365,753 A | * | 1/1968 | Prenner | B65D 63/1027 24/16 PB |
| 3,855,670 A | * | 12/1974 | Brudy | B65D 63/1081 24/16 PB |
| 3,994,048 A | * | 11/1976 | Rosenthal | A63C 11/025 24/16 R |
| 4,015,762 A | * | 4/1977 | Mendillo | A63C 11/025 280/814 |
| 4,088,136 A | * | 5/1978 | Hasslinger | A61M 25/02 128/DIG. 26 |
| 4,431,226 A | * | 2/1984 | Weilert | A45F 3/14 294/150 |
| 4,982,522 A | * | 1/1991 | Norton | F41C 33/00 224/220 |
| 5,008,987 A | * | 4/1991 | Armour, II | A44B 18/00 24/306 |

(Continued)

OTHER PUBLICATIONS

Flexi Light Attachment for Leash Battery Operated, as available on Google.com Jul. 25, 2011, 2 pgs.

(Continued)

Primary Examiner — Jason W San
(74) Attorney, Agent, or Firm — Frost Brown Todd LLC

(57) ABSTRACT

A pet leash accessory assembly may be utilized with a variety of off-the-shelf accessories including, but not limited to, flashlights, pet waste bags and personal attack deterrents. The pet leash accessory assembly allows an off-the-shelf accessory to be attached at different locations on the lease, for example attached to the leash handle or strap, and to be attached to many different types of leashes, for example, flat, thin leashes and round, rope-like leashes.

6 Claims, 25 Drawing Sheets

(56) References Cited

U.S. PATENT DOCUMENTS

| | | | | |
|---|---|---|---|---|
| 5,075,933 A * | 12/1991 | Kemper | A44B 18/00 | 24/16 R |
| 5,104,076 A * | 4/1992 | Goodall, Jr. | A45F 5/02 | 224/251 |
| 5,167,050 A * | 12/1992 | Korsen | A44B 18/00 | 24/16 R |
| 5,168,603 A * | 12/1992 | Reed | A44B 18/00 | 24/16 PB |
| 5,177,986 A * | 1/1993 | Jensen | A63C 11/021 | 428/100 |
| D350,628 S * | 9/1994 | Williams | D30/153 | |
| 5,429,075 A * | 7/1995 | Passarella | F21V 33/008 | 119/795 |
| 5,745,958 A * | 5/1998 | Kaldor | A44B 18/00 | 24/16 PB |
| D401,137 S * | 11/1998 | Boelling | D8/382 | |
| 5,839,394 A * | 11/1998 | Dickison | A01K 27/005 | 119/795 |
| 5,882,320 A * | 3/1999 | Peterson | A61F 15/004 | 128/876 |
| 5,957,141 A * | 9/1999 | Elkins | A44B 18/00 | 132/273 |
| 5,964,386 A * | 10/1999 | Cote | A45F 5/02 | 224/236 |
| 6,019,067 A * | 2/2000 | Carey | A01K 27/006 | 119/795 |
| 6,029,321 A * | 2/2000 | Fisher | F41C 33/001 | 124/35.2 |
| 6,145,715 A * | 11/2000 | Slonim | A47G 23/0225 | 224/148.3 |
| 6,317,933 B1 * | 11/2001 | Suenaga | A44B 18/0088 | 24/16 R |
| 6,394,720 B1 * | 5/2002 | McCay | B62J 7/08 | 410/100 |
| 6,430,784 B1 * | 8/2002 | Dudek | A44B 18/00 | 24/16 R |
| 6,439,168 B1 * | 8/2002 | Maglich | A01K 27/003 | 119/792 |
| 6,447,037 B1 * | 9/2002 | Crouch | B65D 33/14 | 294/149 |
| 6,449,816 B1 * | 9/2002 | Dudek | A44B 18/00 | 24/16 R |
| 6,606,768 B2 * | 8/2003 | Henry | A45F 5/00 | 24/298 |
| 6,622,346 B2 * | 9/2003 | Graham | B65D 63/1018 | 24/16 R |
| 6,631,539 B1 * | 10/2003 | Chang | B60P 7/0807 | 24/265 H |
| 6,637,079 B1 * | 10/2003 | Goulait | A44B 18/0011 | 24/306 |
| 6,701,580 B1 * | 3/2004 | Bandyopadhyay | B65D 63/10 | 24/16 R |
| 6,767,169 B2 * | 7/2004 | Zhan | B61D 45/003 | 410/100 |
| 6,802,109 B2 * | 10/2004 | Hede | A44B 11/28 | 24/165 |
| 6,851,393 B2 * | 2/2005 | Bremm | A01K 27/003 | 119/770 |
| 7,219,405 B1 * | 5/2007 | Nevens | A41F 11/04 | 24/306 |
| 7,322,780 B2 * | 1/2008 | Hill | B60P 7/0823 | 410/23 |
| 7,484,273 B1 * | 2/2009 | Dupree | A01K 27/004 | 24/3.13 |
| 7,587,796 B1 * | 9/2009 | Schultz | B65D 63/10 | 24/16 R |
| 7,624,480 B2 * | 12/2009 | Coronel | A61M 25/02 | 128/DIG. 15 |
| 7,743,735 B2 * | 6/2010 | Weinberg | A01K 27/003 | 119/795 |
| 7,895,716 B2 * | 3/2011 | Taillon | F16L 3/14 | 174/135 |
| 8,210,405 B1 * | 7/2012 | Pritchard | F41C 33/002 | 224/150 |
| D675,023 S * | 1/2013 | Colgan | D3/327 | |
| 8,371,000 B1 * | 2/2013 | Schultz | B65D 63/10 | 24/16 R |
| 8,458,864 B1 * | 6/2013 | Patton | A61F 5/3792 | 24/16 R |
| 8,628,488 B2 * | 1/2014 | Serola | A61B 17/1325 | 128/846 |
| 8,839,745 B1 * | 9/2014 | Johnston | A01K 27/003 | 119/769 |
| D717,007 S * | 11/2014 | Miksovsky | D30/153 | |
| 9,144,227 B2 * | 9/2015 | Stein | A01K 27/003 | |
| 9,301,505 B1 * | 4/2016 | Luna | A01K 27/002 | |
| 2002/0092138 A1 * | 7/2002 | Spiller | A01K 27/001 | 24/306 |
| 2005/0081798 A1 * | 4/2005 | Munroe | A01K 27/003 | 119/795 |
| 2006/0032032 A1 * | 2/2006 | Cheng | F16L 3/23 | 24/306 |
| 2006/0032461 A1 * | 2/2006 | Sporn | A01K 27/005 | 119/797 |
| 2006/0070584 A1 * | 4/2006 | Larouche | A01K 27/004 | 119/795 |
| 2006/0143875 A1 * | 7/2006 | Kunold | B65D 33/1616 | 24/30.5 R |
| 2009/0172926 A1 * | 7/2009 | Kern | A01K 27/003 | 24/444 |
| 2009/0241300 A1 * | 10/2009 | Ferguson | B60P 7/0823 | 24/300 |
| 2009/0308329 A1 * | 12/2009 | Sanchez | A01K 27/003 | 119/795 |
| 2009/0320769 A1 * | 12/2009 | McCay | A01K 27/005 | 119/798 |
| 2010/0050957 A1 * | 3/2010 | Elkins | A01K 1/04 | 119/793 |
| 2010/0257703 A1 * | 10/2010 | Vass | B60P 7/0823 | 24/306 |
| 2010/0269764 A1 * | 10/2010 | Rogers | A01K 27/001 | 119/797 |
| 2010/0319167 A1 * | 12/2010 | Nirmel | A44B 18/0084 | 24/306 |
| 2011/0083616 A1 * | 4/2011 | Elkins | A01K 1/04 | 119/792 |
| 2012/0023711 A1 * | 2/2012 | Neumann | B60P 7/0823 | 24/265 H |
| 2012/0137988 A1 * | 6/2012 | Kali | A01K 27/003 | 119/795 |
| 2012/0180268 A1 * | 7/2012 | Chen | B65D 63/1018 | 24/16 R |
| 2012/0186538 A1 * | 7/2012 | Newton | A01K 27/003 | 119/795 |
| 2012/0247398 A1 * | 10/2012 | Poch | A01K 27/003 | 119/795 |
| 2013/0160718 A1 * | 6/2013 | Weaver-Pelaez | A01K 27/003 | 119/795 |
| 2013/0167782 A1 * | 7/2013 | Poch | A01K 27/003 | 119/795 |
| 2013/0192539 A1 * | 8/2013 | Woodruff | A01K 27/003 | 119/798 |
| 2013/0228140 A1 * | 9/2013 | Stein | A01K 27/003 | 119/770 |
| 2014/0116355 A1 * | 5/2014 | Blizzard | A01K 27/002 | 119/793 |
| 2014/0182084 A1 * | 7/2014 | Hill | A44B 11/04 | 24/115 H |
| 2014/0366813 A1 * | 12/2014 | Condit | A01K 27/003 | 119/795 |
| 2015/0053145 A1 * | 2/2015 | Miksovsky | A01K 27/003 | 119/772 |
| 2015/0075448 A1 * | 3/2015 | Clark | A01K 27/00 | 119/797 |
| 2015/0090195 A1 * | 4/2015 | Krupich | A01K 27/002 | 119/792 |
| 2015/0150221 A1 * | 6/2015 | Schlosser | A01K 27/005 | 119/795 |

(56) References Cited

U.S. PATENT DOCUMENTS

| | | | | |
|---|---|---|---|---|
| 2015/0150222 A1* | 6/2015 | Schlosser | ............. | A01K 27/003 |
| | | | | 119/797 |
| 2015/0189860 A1* | 7/2015 | Peterson | .............. | A01K 27/002 |
| | | | | 119/793 |
| 2015/0223432 A1* | 8/2015 | Lund | .................... | A01K 27/003 |
| | | | | 119/792 |
| 2015/0237831 A1* | 8/2015 | Beck | .................... | A01K 27/003 |
| | | | | 119/795 |
| 2015/0250144 A1* | 9/2015 | Lin | ...................... | A01K 27/003 |
| | | | | 119/792 |
| 2015/0320012 A1* | 11/2015 | Simons | ................ | A01K 1/0613 |
| | | | | 119/795 |
| 2016/0050886 A1* | 2/2016 | Bandler | ............... | A01K 27/001 |
| | | | | 119/792 |
| 2016/0095298 A1* | 4/2016 | Bodrie | ................. | A01K 27/003 |
| | | | | 119/793 |
| 2016/0165849 A1* | 6/2016 | Lewis | .................. | A01K 27/003 |
| | | | | 119/770 |

OTHER PUBLICATIONS

Natures Miracle, Advanced Pick-Up Bags & Dispenser LED Flashlight, as available on petmountain.com Jan. 7, 2014, 4 pgs.
Out! LED Attach-Leash Flashlight & Waste Bag Holder/Dis 30 bags, as available on ebay.com, Jan. 7, 2014, 3 pgs.
PatentoPet DOG-e-Lite 6 Ft Black Leash/Black Light, as available on Amazon.com Jul. 3, 2012, 3 pgs.
Ruff and Ready Pets, Retractable Dog Leash with Flashlight—Black, as available on Amazon.com Jul. 26, 2011, 6 pgs.

* cited by examiner

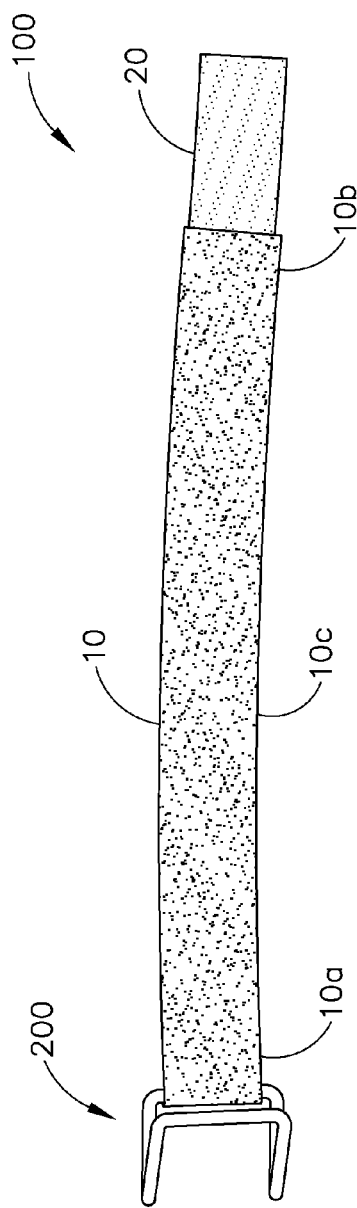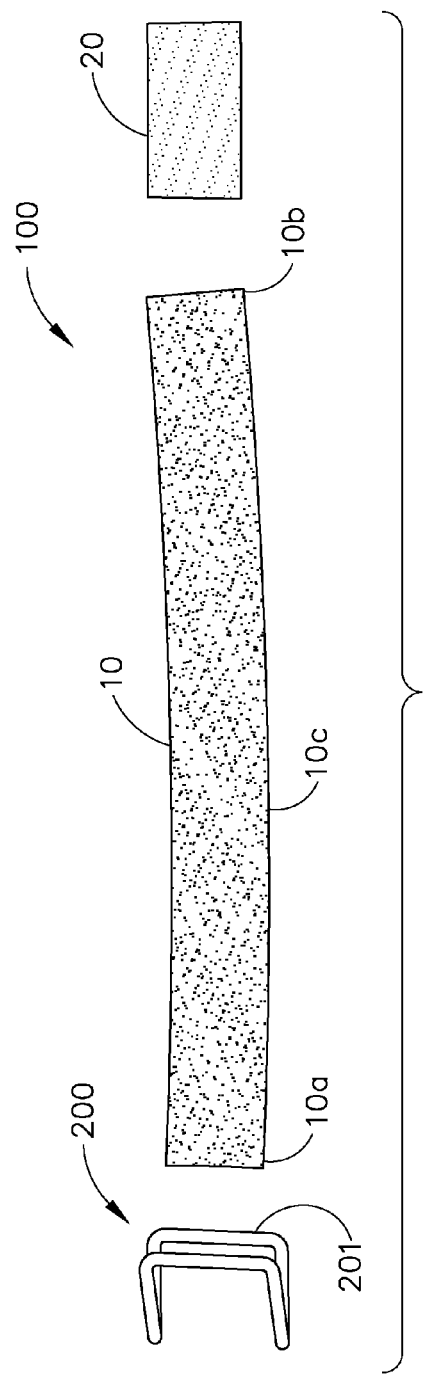

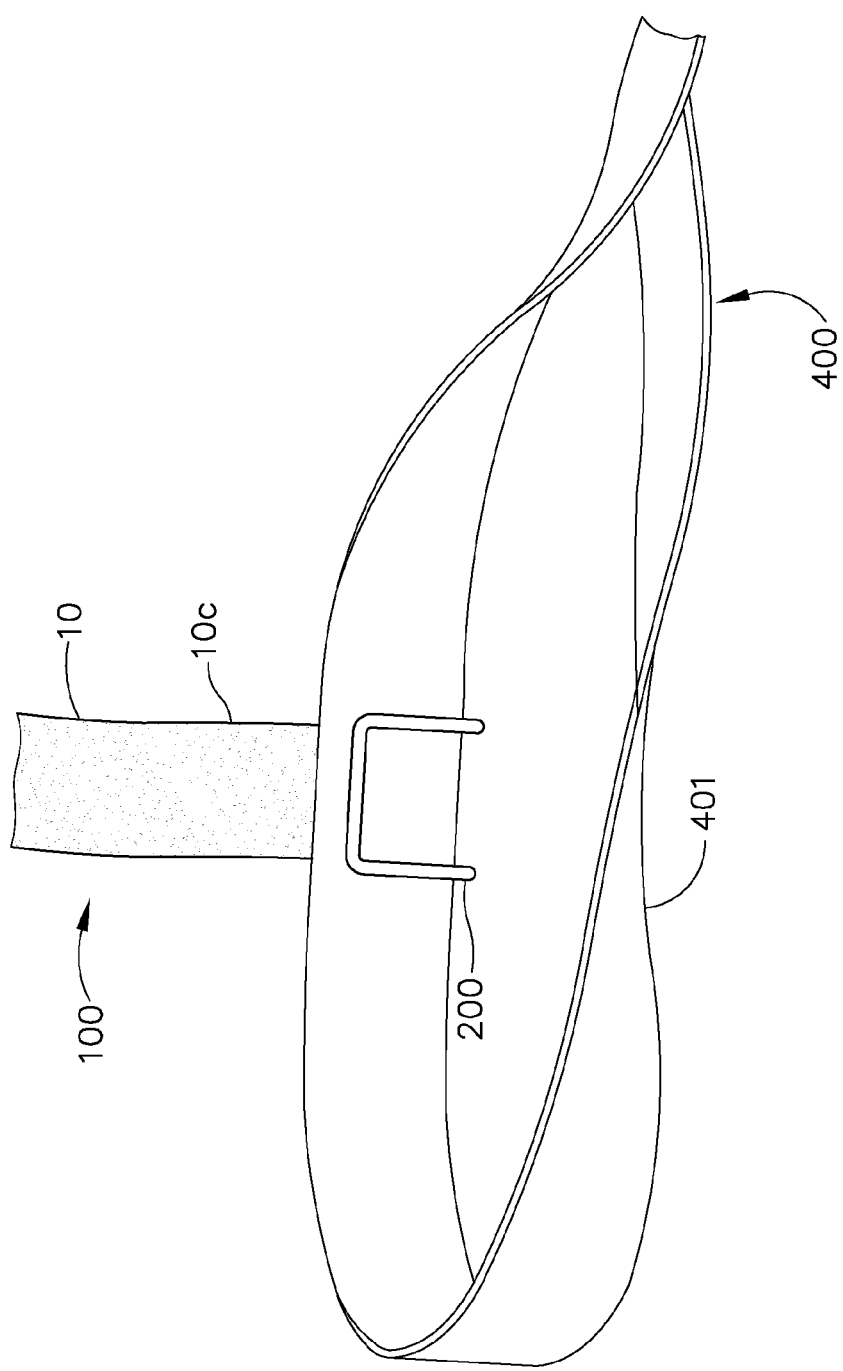

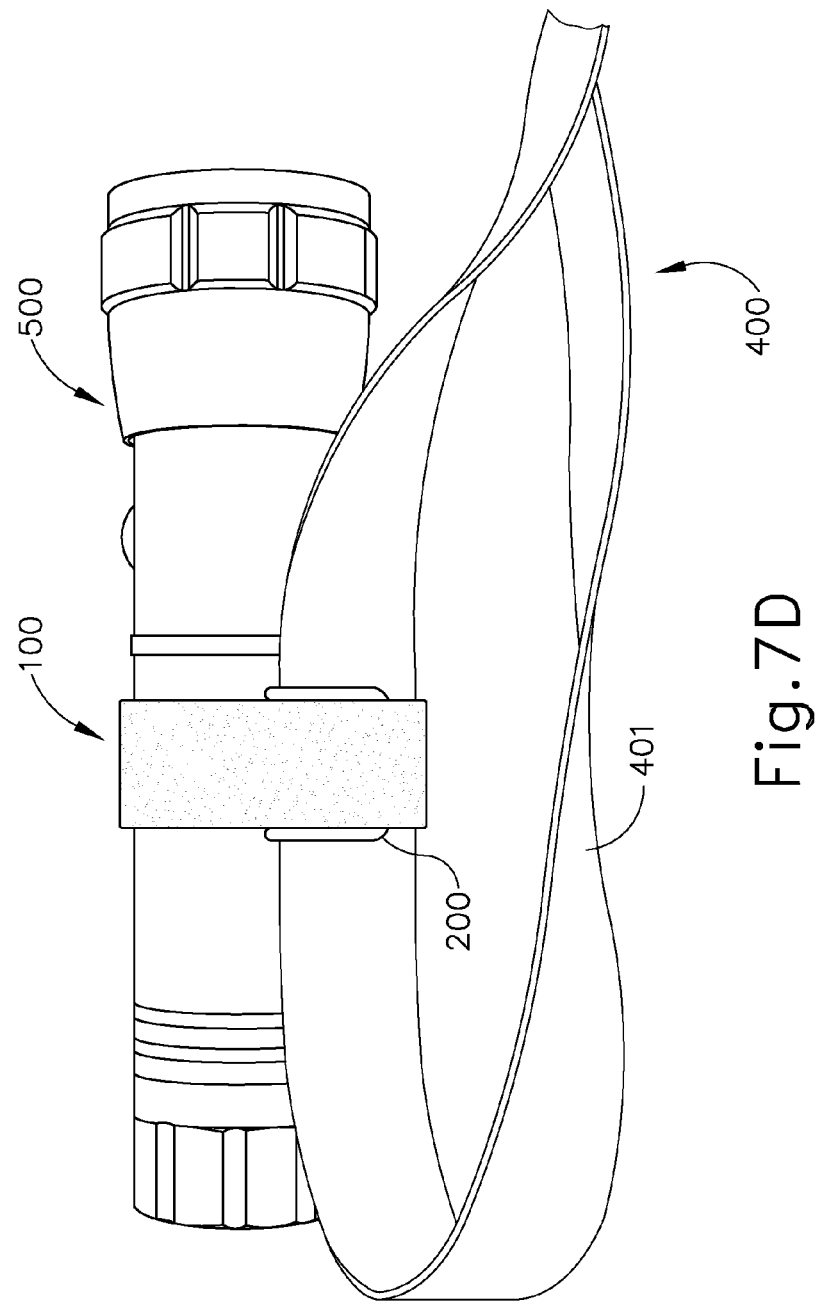

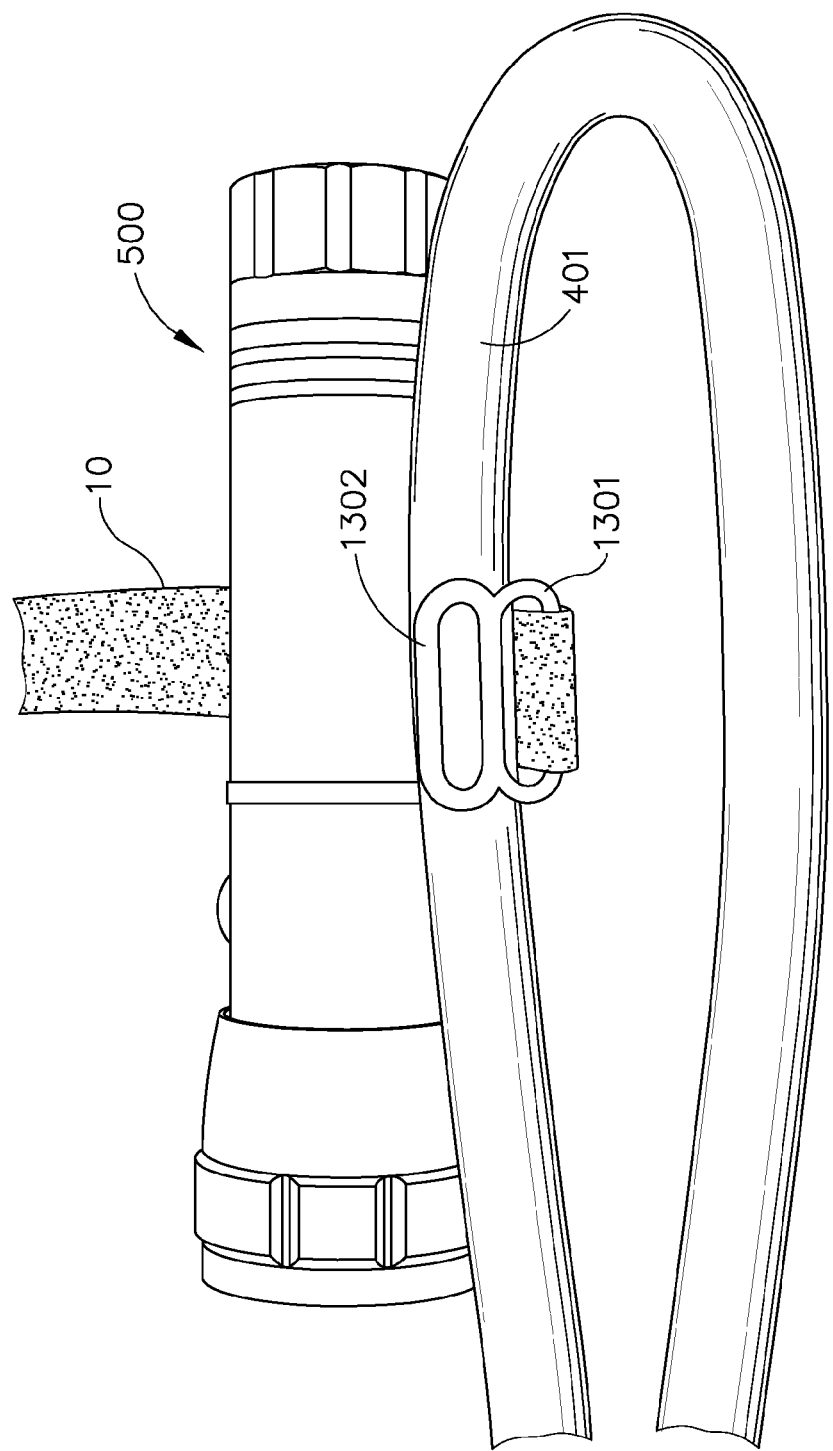

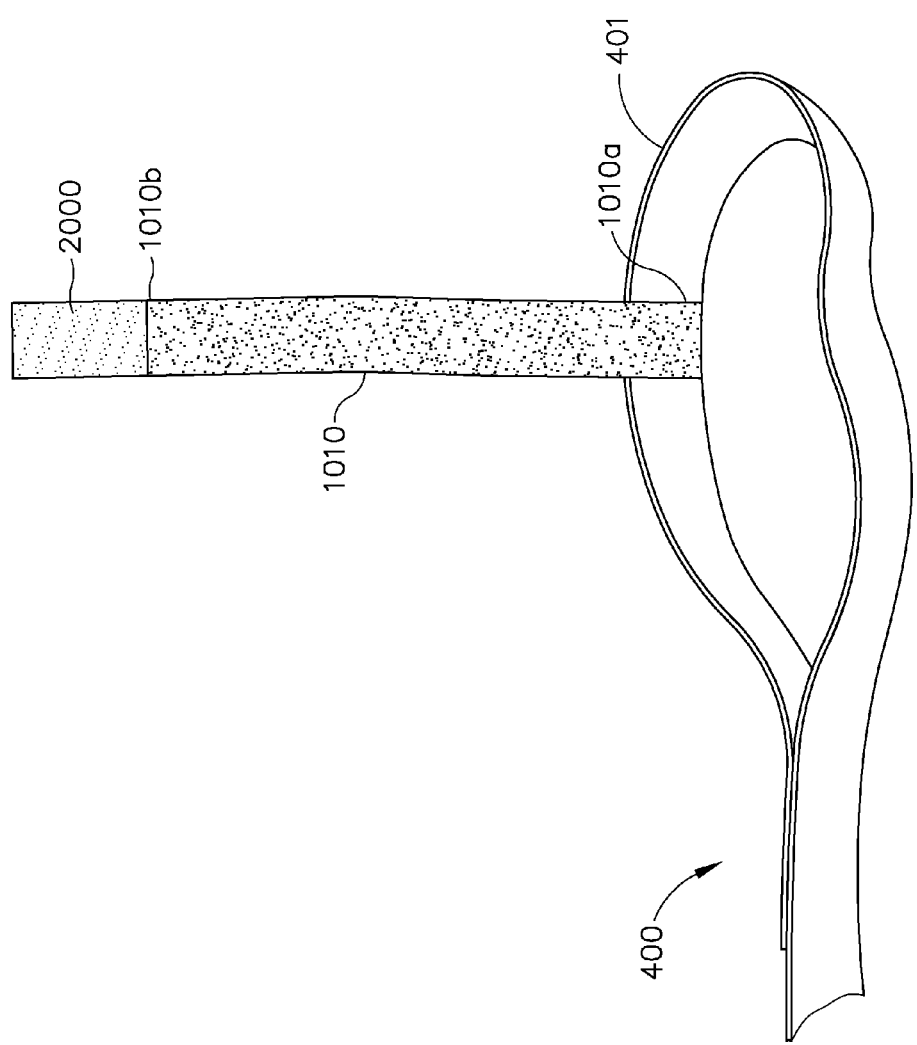

PET LEASH ACCESSORY ASSEMBLY

PRIORITY

This application claims priority to U.S. Provisional Patent Application No. 61/983,000, entitled "Pet Leash Accessory Assembly," filed Apr. 23, 2014, the disclosure of which is incorporated by reference herein.

TECHNICAL FIELD

The present disclosure is directed to a pet leash accessory assembly, which may be utilized with a variety of off-the-shelf accessories including, but not limited to, flashlights, pet waste bags and personal attack deterrents. The pet leash accessory assembly allows an off-the-shelf accessory to be attached at different locations on a leash, for example attached to the leash handle or strap, and to be attached to many different types of leashes, for example, flat, thin leashes and round, rope-like leashes.

BACKGROUND

Many pet owners live in areas which require them to keep their pets on a leash when they are being walked. For example, most dog owners living in urban areas are required by law to keep their dogs restrained by a leash, and additionally, to pick up their dog's waste. Dog owners who do not have yards of their own, often must walk their dogs in the early hours of the morning or at night when it is dark. Controlling a dog while carrying pet waste bags and/or flashlights along with other necessities such as pepper spray, cell phones, purses, wallets, keys and the like, may present a challenge. Moreover, it is easy to forget or misplace all of these items, which in some instances, means that the pet owner has return home to retrieve them.

Various attempts have been made to address the aforementioned challenges. Some attempts utilize an all-in-one apparatus in which the flashlight and/or waste bag is integral with the leash or the leash handle. This attempted solution can be problematic. In addition to being costly, if the flashlight, waste bag, leash, and/or leash handle breaks, then the all-in-one apparatus is no longer fit for use and the entire thing must be replaced. Some attempts have utilized a specialized flashlight that interfaces with an adapter, which allows it to be hooked to a leash. This attempted solution may also be costly, particularly because it requires that a specialized, rather than a general purpose flashlight, be used.

Thus there remains a need for an apparatus that is universal, i.e., can be used with any off-the-shelf accessory (e.g., flashlights, waste bag containers, attack deterrent sprays, etc.). It would be particularly advantageous if such an apparatus could be utilized with various configurations of leashes, such as ones that are either flat and thin, flat and thick, round and rope-like, etc. Moreover, it would be advantageous if the universal adapter could be placed on the handle or on the strap of the leash.

SUMMARY

The unique solution that addresses the aforementioned need is a new leash accessory assembly as described herein. Advantageously, the leash accessory assembly may be used to removably attach an off-the-shelf accessory to various configurations of commercially available leashes. The leash accessory assembly eliminates the need to buy specialized accessories that may be used in only one context—walking an animal on a leash.

The leash accessory assembly according to the disclosure comprises: a flexible strap having a first end, a second opposing end and an intermediate portion between the first end and the second opposing end; a strap fastener disposed on the second opposing end of the strap, which is configured to wrap around the leash accessory and fasten the second opposing end of the strap to the intermediate portion of the strap once the strap has been wrapped around the leash accessory. This and other embodiments of the leash accessory assembly are set forth in greater detail below.

BRIEF DESCRIPTION OF THE DRAWINGS

It is believed that the present invention will be better understood from the following description of certain examples taken in conjunction with the accompanying drawings, in which like reference numerals identify like elements.

FIG. 2 is a top plan view of the leash accessory assembly of FIG. 1.

FIG. 3 is a top plan exploded view of the leach accessory assembly of FIG. 1.

FIG. 7A is a top perspective view of the leash accessory assembly of FIG. 1 being coupled with a leash, showing the leash inserted within the leash fastener.

FIG. 7D is a top perspective view of the leash accessory assembly of FIG. 7A, showing the leash accessory assembly coupled with the leash accessory.

FIG. 17B is a top perspective view of the leash accessory assembly of FIG. 17A, showing a leash accessory positioned within the leash accessory assembly.

FIG. 20A is a top perspective view of the leash accessory assembly of FIG. 18 being coupled with a leash, showing the leash coupled with a strap of the leash accessory assembly.

Figure 1:
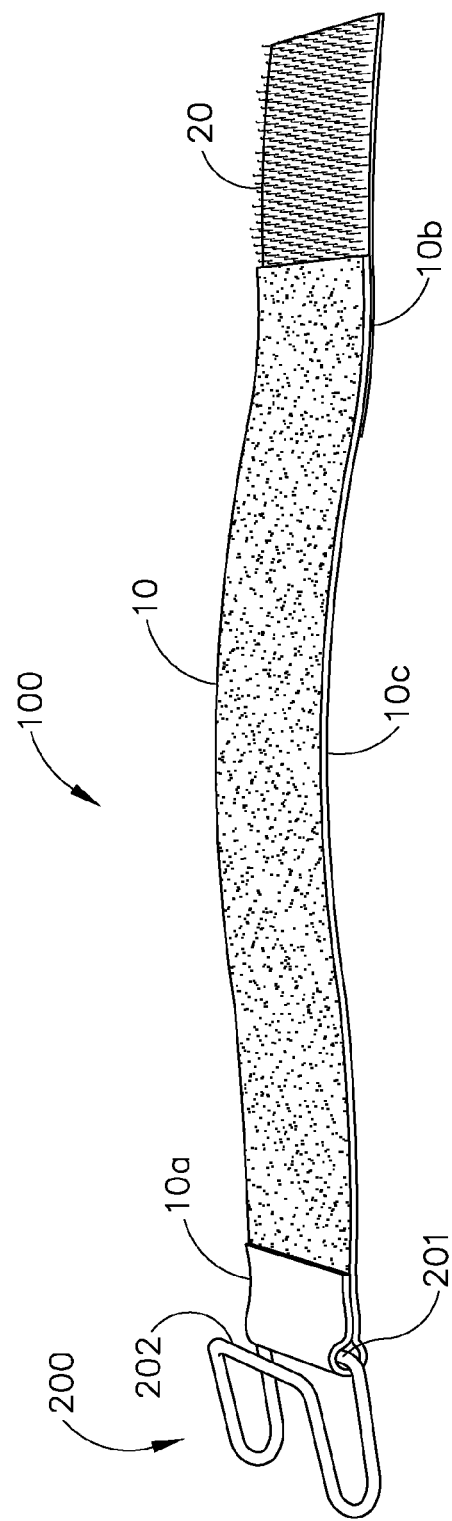
FIG. 1 is a top perspective view of an embodiment of a leash accessory assembly in an open configuration.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects of the present disclosure, and together with the descriptions serve to explain the principles and concepts of the present disclosure; it being understood, however, that the present disclosure is not limited to the precise arrangements shown.

DETAILED DESCRIPTION

The following description and embodiments of the present disclosure should not be used to limit the scope of the present disclosure. Other examples, features, aspects, embodiments, and advantages of the present disclosure will become apparent to those skilled in the art from the following description. As will be realized, the present disclosure may contemplate alternate embodiments than those exemplary embodiments specifically discussed herein without departing from the scope of the present disclosure. Accordingly, the drawings and descriptions should be regarded as illustrative in nature and not restrictive.

"Leash" as used herein, means a line for leading and/or restraining an animal, for example, a dog. A leash may comprise a flexible strap that is flat or round, and has a first and second ends. The first end may comprise a handle portion, which may be formed for example, by looping the flexible strap back onto itself. The second end may comprise a clasp assembly for engaging a pet collar.

"Accessory" as used herein, means any device that may be useful to an individual when his or her pet is restrained by a leash. Non-limiting examples of accessories may be selected from the group of: flashlights; waste bags; personal attack deterrents, for example pepper spray or mace; wallets; tissue dispensers; dog treat containers; cell phone holders; sunscreen holders; collapsible dog bowls; water bottles; and combinations thereof.

"Flexible strap" as used herein, means a piece of material that is used to wrap around and secure an accessory. In some embodiments, the material is elastic. Non-limiting examples of elastic securing means may be selected from the group of: rubber straps; Velstretch® straps (Velcro USA, Inc.; Manchester, N.H.); plastic straps; and combinations thereof.

"Fasteners" as used herein, means at least a pair of members that are used to fasten a flexible strap to itself. Non-limiting examples of pairs of fastening members may be selected from the group of: hook and loop fasteners; hook and eye fasteners; snaps; frogs; clips; and combinations thereof. In some embodiments, the fastening member is Velcro®, from Velcro USA, Inc. (Manchester, N.H.).

"Wire fastener" as used herein refers to a fastener comprising flexible strand(s) or rod(s) of metal or plastic.

Referring now to FIGS. 1-3, embodiments of a leash accessory assembly 100 in an open configuration and a leash accessory assembly 100 that has been disassembled are shown. The leash accessory assembly 100 comprises: a flexible strap 10 having a first end 10a, a second opposing end 10b, and an intermediate portion 10c between the first end 10a and the second opposing end 10b. The leash accessory assembly 100 further comprises a strap fastener 20 disposed on the second opposing end 10b of strap 10, which may fasten the second opposing end 10b of the strap 10 to the intermediate portion 10c of the strap 10 once the strap 10 has been wrapped around the leash accessory (not shown). The strap fastener 20 may comprise a separate unit that is attached to the second opposing end 10b of the flexible strap 10 or may be integral with the second opposing end 10b of the flexible strap 10. Non-limiting examples of strap fasteners that are integral with the second opposing end 10b of the flexible strap 10 include one member of the fasteners as described above. The second member of fastening member pair may be disposed on the intermediate portion 10c of the flexible strap 10. For example, hooks may be disposed on the second opposing end 10b of the flexible strap 10 and eyes may be disposed on the intermediate portion 10c of the flexible strap 10. Fastener(s) may be affixed to portions of the flexible strap 10 using any suitable means. Non-limiting means may be selected from the group of being: sewn on; glued on; welded on, e.g. by plastic welding; and combinations thereof.

Figure 4:
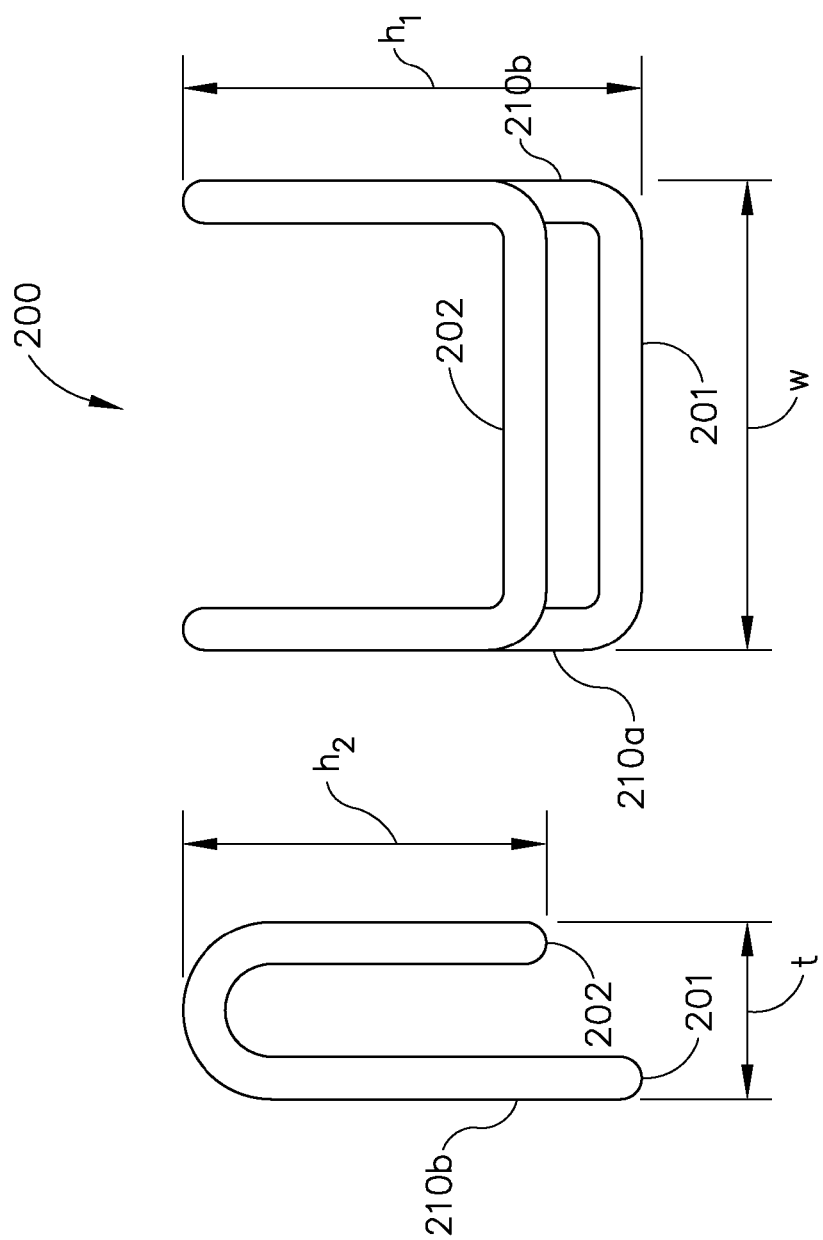
FIG. 4 is a schematic of a leash fastener of the leash accessory assembly of FIG. 1.

The leash accessory assembly 100 further comprises a leash fastener 200 secured to the first end 10a of the flexible strap 10. FIG. 4 shows the leash fastener 200 in more detail. As illustrated, the leash fastener 200 has a substantially J-shape such that the leash fastener 200 comprises a wire having in a first plane, a first terminal portion 201 and two legs 210a, 210b extending laterally therefrom, wherein the two legs 210a, 210b are bent back upon themselves in a second plane disposed above the first plane and are joined together at opposite ends of a second terminal portion 202 of the wire. In the present example, the leash fastener 200 defines a first height $h_1$ from a top of the leash fastener 200 to the first plane at first terminal portion 201. This first height $h_1$ may be about 0.680 inches. The leash fastener 200 further defines a second height $h_2$ from a top of the leash fastener 200 to the second plane at the second terminal portion 202. This second height $h_2$ may be about 0.52 inches. While the illustrated embodiment shows first height $h_1$ as being longer than second height $h_2$, the first height $h_1$ can be equal to or shorter than the second height $h_2$. For instance, the height may vary to accommodate various types of leashes that are coupled with the leash accessory assembly. The leash fastener 200 also defines a width w of about 0.760 inches and a thickness t of about 0.275 inches. A wire diameter of about 0.062 inches may be used for the leash fastener 200. Of course, other suitable dimensions or configurations for the leash fastener 200 will be apparent to one with ordinary skill in the art in view of the teachings herein. For instance, the leash fastener 200 can have other shapes, as will be discuss in more detail below.

Figure 5:
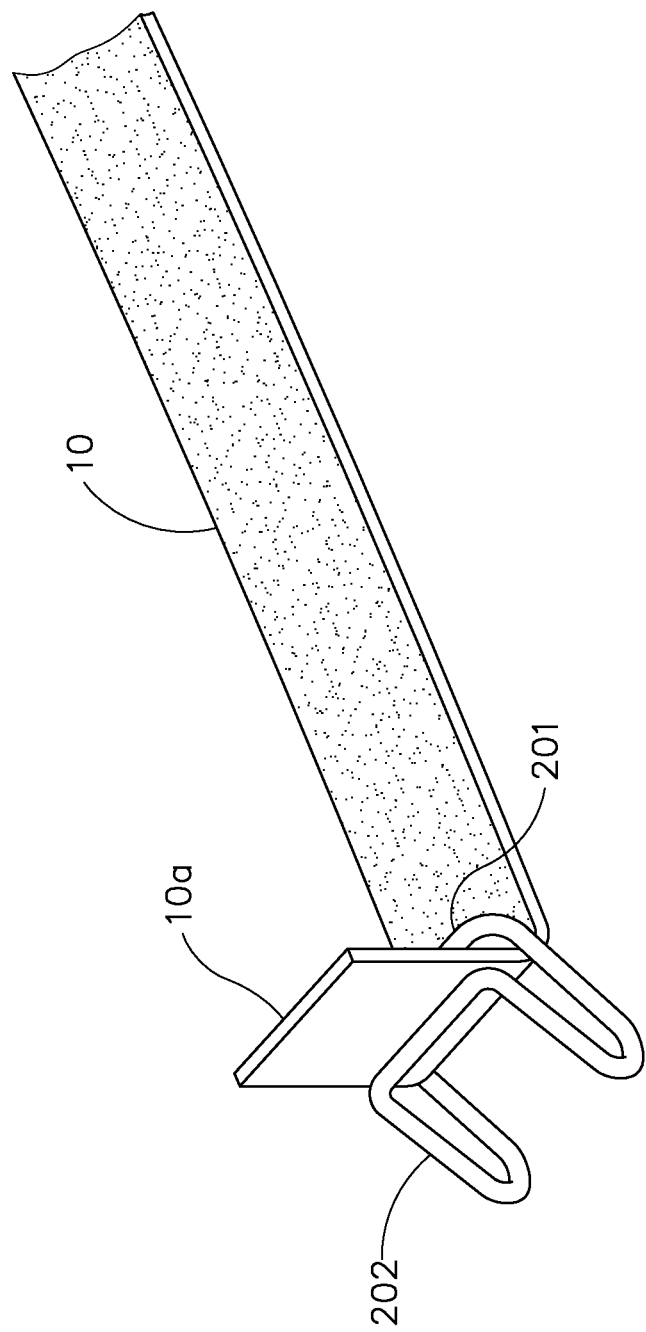
FIG. 5 is a top perspective view of a strap of the leash accessory assembly of FIG. 1 being coupled with the leash fastener.
Figure 6:
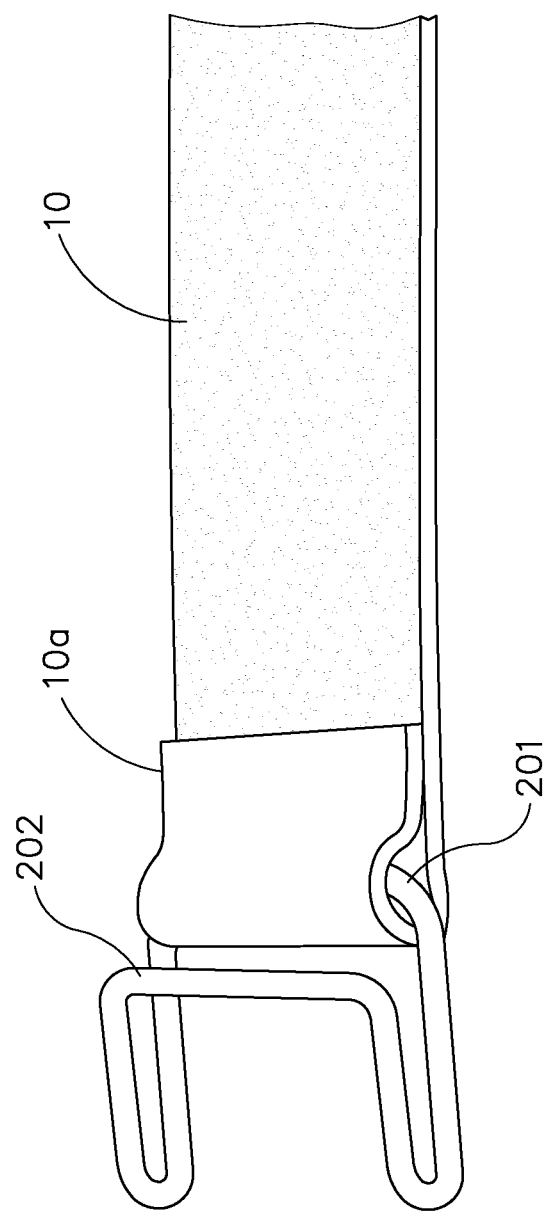
FIG. 6 is a bottom perspective view of the strap of FIG. 5 coupled with the leash fastener.

Referring now to FIGS. 5-6, the leash fastener 200 may be secured to the first end 10*a* of the flexible strap 10 by looping the first end 10*a* of the flexible strap 10 around the first terminal portion 201 of the leash fastener 200 (FIG. 5) and fastening the first end 10*a* of the flexible strap 10 to an intermediate portion 10*c* of the flexible strap 10 (FIG. 6). The first end 10*a* of the strap 10 may then be secured to the intermediate portion 10*c* of the strap 10 to maintain the position of the leash fastener 200 relative to the strap 10. The first end 10*a* may be secured by any suitable means. Non-limiting means may be selected from the group of being: sewn on; glued on; welded on, e.g. by plastic welding; and combinations thereof.

With the leash fastener 200 coupled with the strap 10, the leash accessory assembly 100 can be used to attach one or more accessories to a pet leash. In some embodiments, the accessory may be selected from the group of: flashlights; waste bags; personal attack deterrents, for example pepper spray or mace; wallets; tissue dispensers; dog treat containers; cell phone holders; sunscreen holders; collapsible dog bowls; water bottles; and combinations thereof. In some embodiments, the accessory may be off-the-shelf, i.e., not specially adapted to be connected to a dog leash.

Figure 7B:
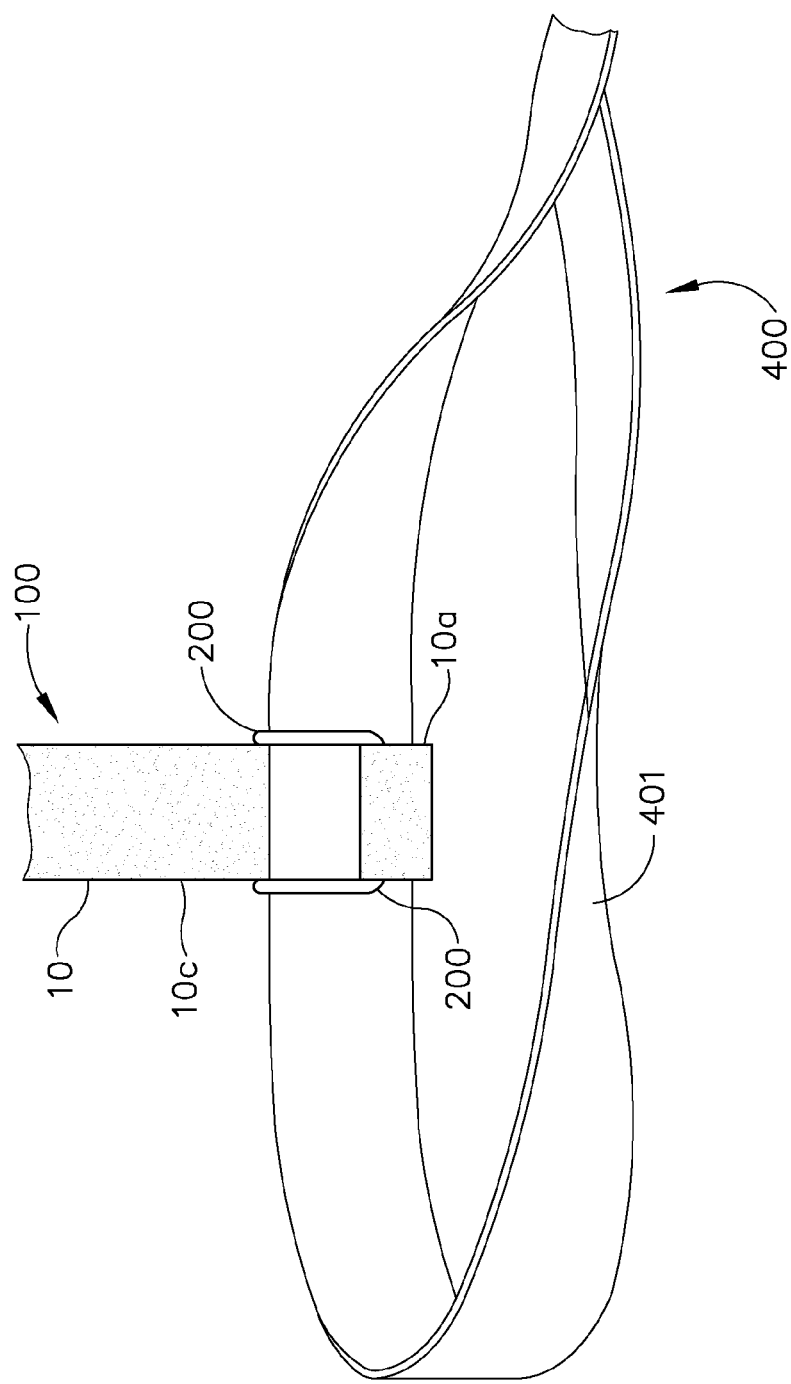
FIG. 7B is a top perspective view of the leash accessory assembly of FIG. 7A, showing the leash flipped to a vertical position.
Figure 7C:
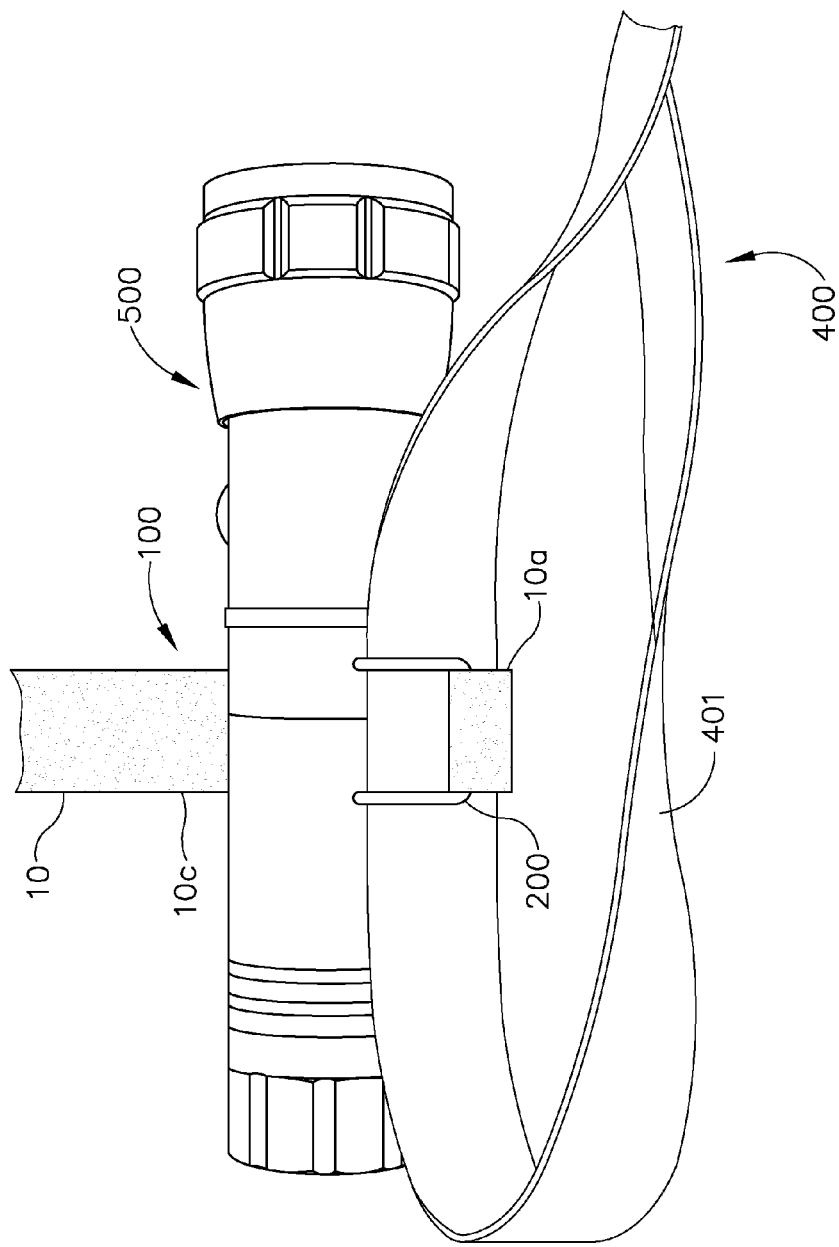
FIG. 7C is a top perspective view of the leash accessory assembly of FIG. 7A, showing a leash accessory positioned within the leash accessory assembly.
Figure 8:
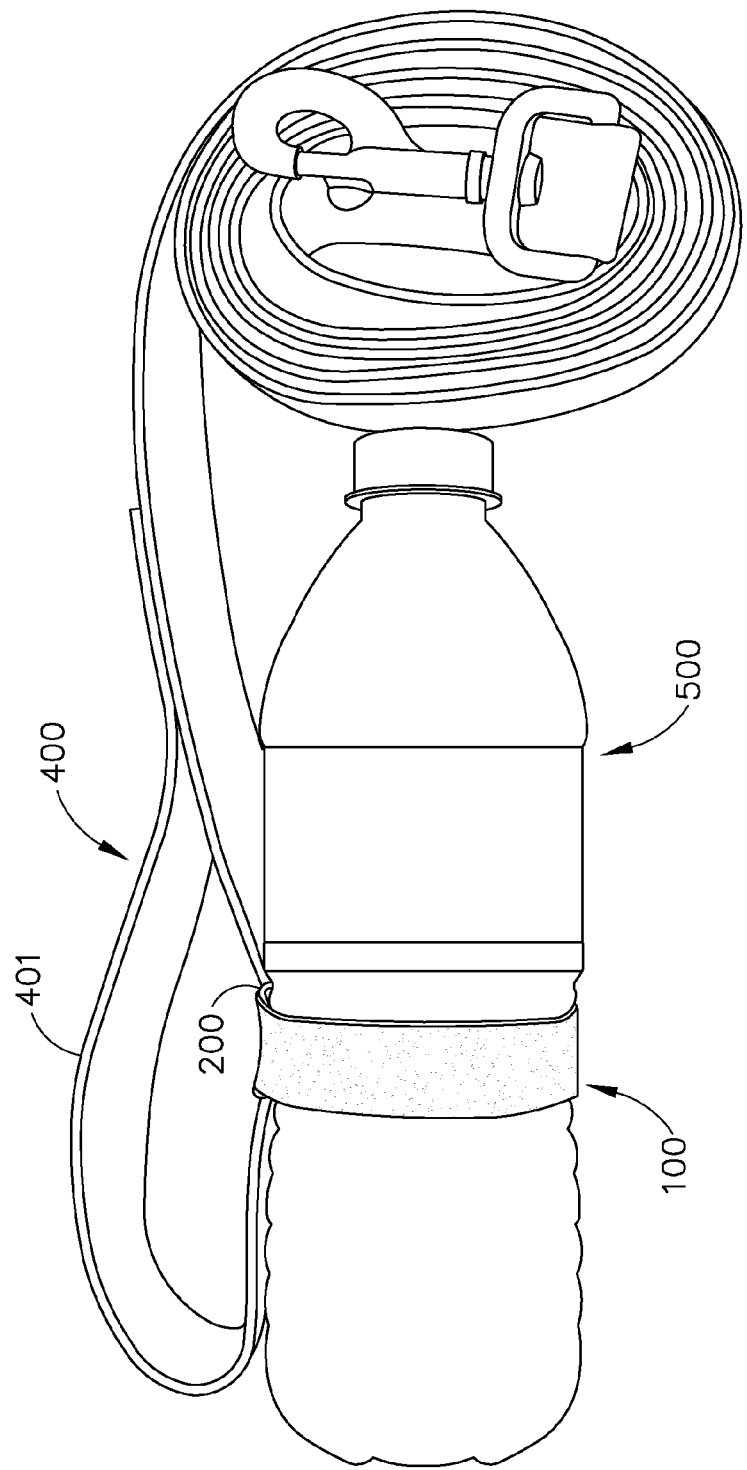
FIG. 8 is a top perspective view of the leash accessory assembly of FIG. 1 coupled with another leash accessory.
Figure 9:
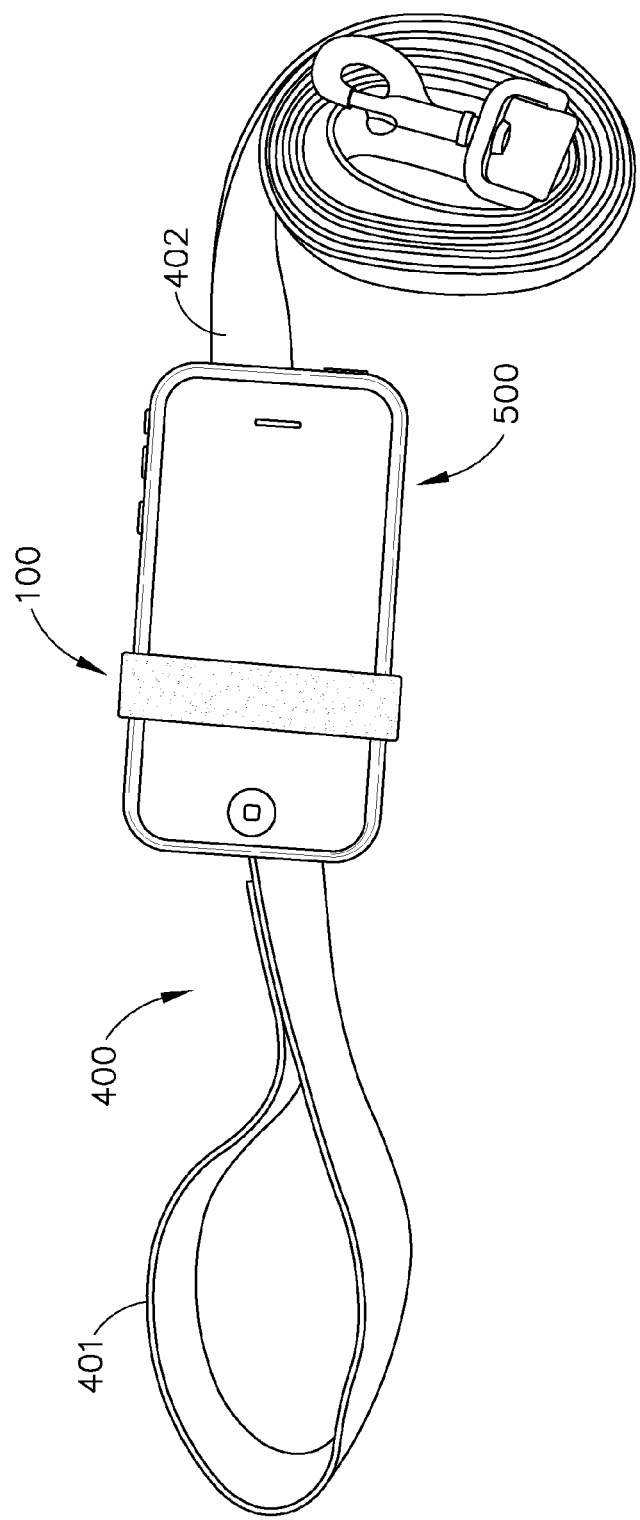
FIG. 9 is a top perspective view of the leash accessory assembly of FIG. 1 coupled with another leash accessory.

Referring now to FIGS. 7A-7D, deployment of the leash accessory assembly 100 to attach a leash accessory 500, such as an off-the-shelf flashlight, to the handle 401 of a leash 400 is shown. Referencing FIGS. 7A and 7B, first the handle 401 of the leash is inserted into the open end, between the first terminal portion 201 and the second terminal portion 202 of the leash fastener 200, such that it is held fast between the first and second planes of the fastener. Referencing FIG. 7C, the leash accessory 500 is placed on a first side of the intermediate portion 10*c* of the flexible strap 10, adjacent to the leash fastener 200. Referencing FIG. 7D, the flexible strap 10 is wrapped around the leash accessory 500, over the leash fastener 200, and the second opposing end 10*b* of the strap is fastened to a second side of the intermediate portion 10*c* of the strap 10 with strap fastener 20. As shown in FIG. 7D, the leash accessory 500 is now secured to the handle 401 of the leash 400 such that its user may guide the light emitted from the flashlight 500 and maintain control of the pet attached to the other end of the leash using a single hand. As described above, other leash accessories 500 may be attached to the leash 400, such as a water bottle (FIG. 8) or a cell phone (FIG. 9). Other suitable leash accessories 500 will be apparent to one with ordinary skill in the art in view of the teachings herein.

Alternatively or in addition to, a leash accessory 500 may be coupled to the strap 402 of the leash 400 downstream of the handle 401, as shown in FIG. 9. Such a leash accessory 500 may be coupled with the same method as described above for coupling the leash accessory 500 with the handle 401 of the leash 400. While the illustrated embodiment shows a single leash accessory 500 being coupled to a leash 400 with leash accessory assembly 100, leash accessory assembly 100 may also be used to couple two or more leash accessories 500 to a leash 400. Other configurations for leash accessory assembly 100 will be apparent to one with ordinary skill in the art in view of the teachings herein.

Figure 10:
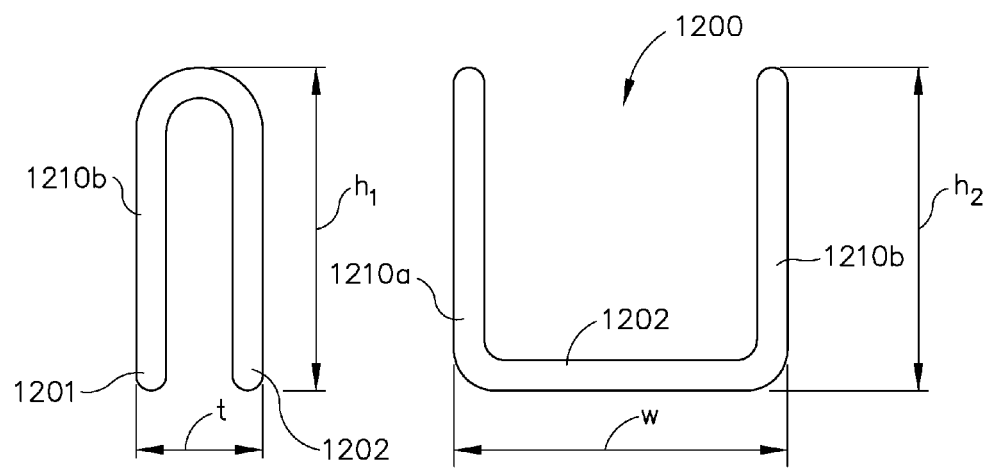
FIG. 10 is a schematic of another embodiment of a leash fastener for use with the leash accessory assembly of FIG. 1.
Figure 11:
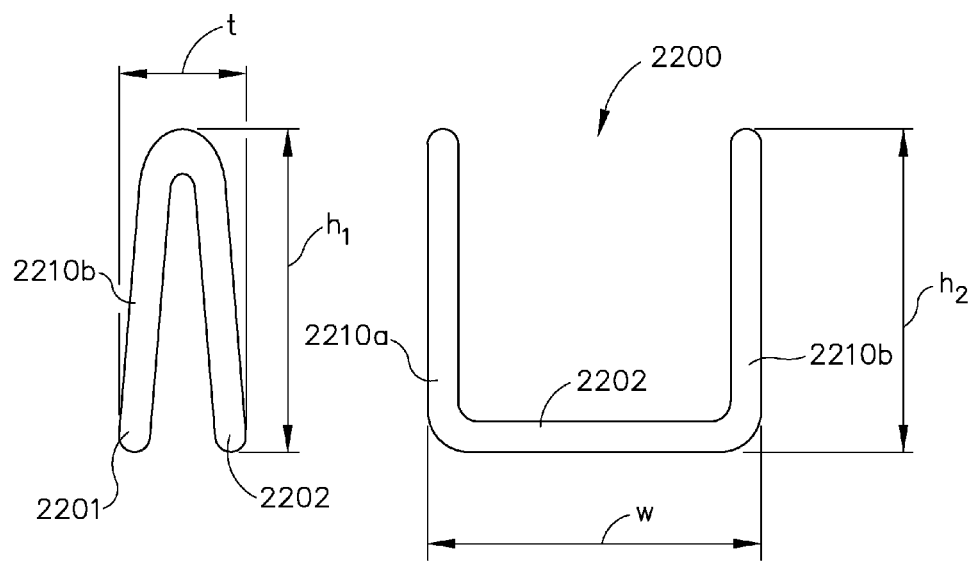
FIG. 11 is a schematic of another embodiment of a leash fastener for use with the leash accessory assembly of FIG. 1.

For instance, FIGS. 10 and 11 show alternative embodiments for the leash fastener 200. FIG. 10 shows a leash fastener 1200 that is substantially similar to leash fastener 200, except that leash fastener 1200 has a U-shaped configuration such that the leash fastener 1200 comprises a wire having in a first plane, a first terminal portion 1201 and two legs 1210*a*, 1210*b* extending laterally therefrom, wherein the two legs 1210*a*, 1210*b* are bent back upon themselves in a second plane substantially equal with the first plane and are joined together at opposite ends of a second terminal portion 1202 of the wire. In the present example, the leash fastener 1200 defines a first height $h_1$ from a top of the leash fastener 1200 to the first plane at first terminal portion 1201. This first height $h_1$ may be about 0.680 inches. The leash fastener 1200 further defines a second height $h_2$ from a top of the leash fastener 1200 to the second plane at the second terminal portion 1202. This second height $h_2$ may also be about 0.680 inches. The leash fastener 1200 also defines a width w of about 0.760 inches and a thickness t of about 0.275 inches. A wire diameter of about 0.062 inches may be used for the leash fastener 1200. Of course, other suitable dimensions or configurations for the leash fastener 1200 will be apparent to one with ordinary skill in the art in view of the teachings herein.

FIG. 11 shows another leash fastener 2200 that is substantially similar to leash fastener 200, except that leash fastener 2200 has a V-shaped configuration such that the leash fastener 2200 comprises a wire having in a first plane, a first terminal portion 2201 and two legs 2210*a*, 2210*b* extending laterally therefrom, wherein the two legs 2210*a*, 2210*b* are bent back upon themselves in a second plane substantially equal with the first plane and are joined together at opposite ends of a second terminal portion 2202 of the wire. In the present example, the leash fastener 2200 defines a first height $h_1$ from a top of the leash fastener 2200 to the first plane at first terminal portion 2201. This first height $h_1$ may be about 0.680 inches. The leash fastener 2200 further defines a second height $h_2$ from a top of the leash fastener 2200 to the second plane at the second terminal portion 2202. This second height $h_2$ may also be about 0.680 inches. While the illustrated embodiment shows the first height $h_1$ as being substantially equal to the second height $h_2$, the first height $h_1$ can be longer or shorter than the second height $h_2$. The leash fastener 2200 also defines a width w of about 0.760 inches and a thickness t of about 0.275 inches. A wire diameter of about 0.062 inches may be used for the leash fastener 2200. Of course, other suitable dimensions or configurations for the leash fastener 2200 will be apparent to one with ordinary skill in the art in view of the teachings herein.

Figure 12:
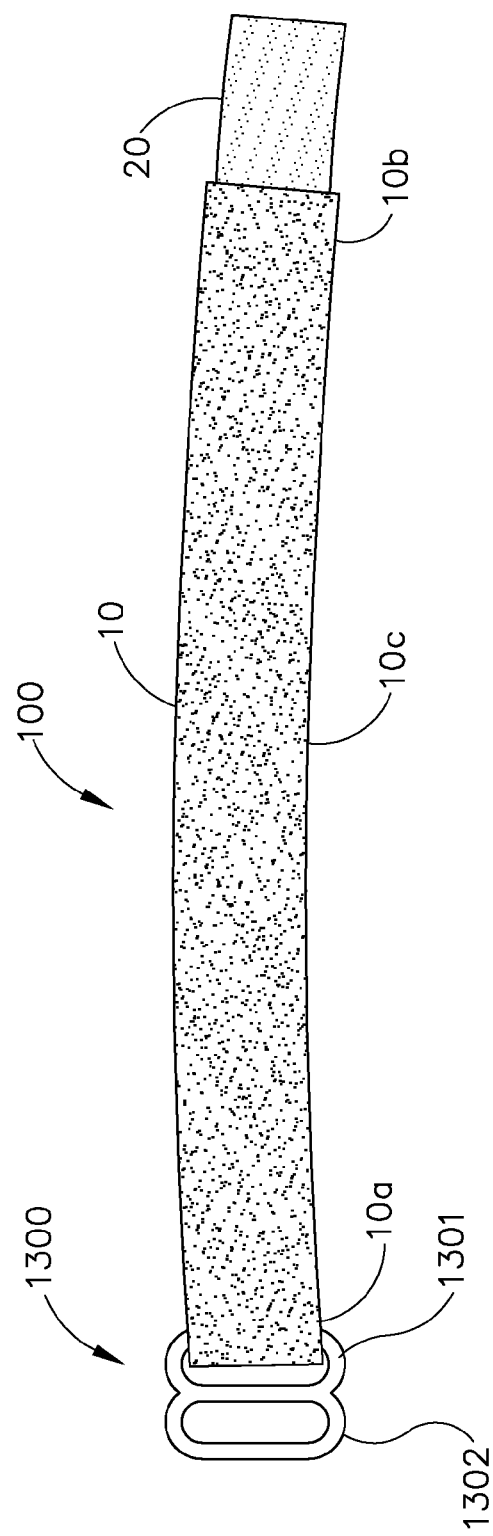
FIG. 12 is a top plan view of another embodiment of a leash accessory assembly in an open configuration.
Figure 13:
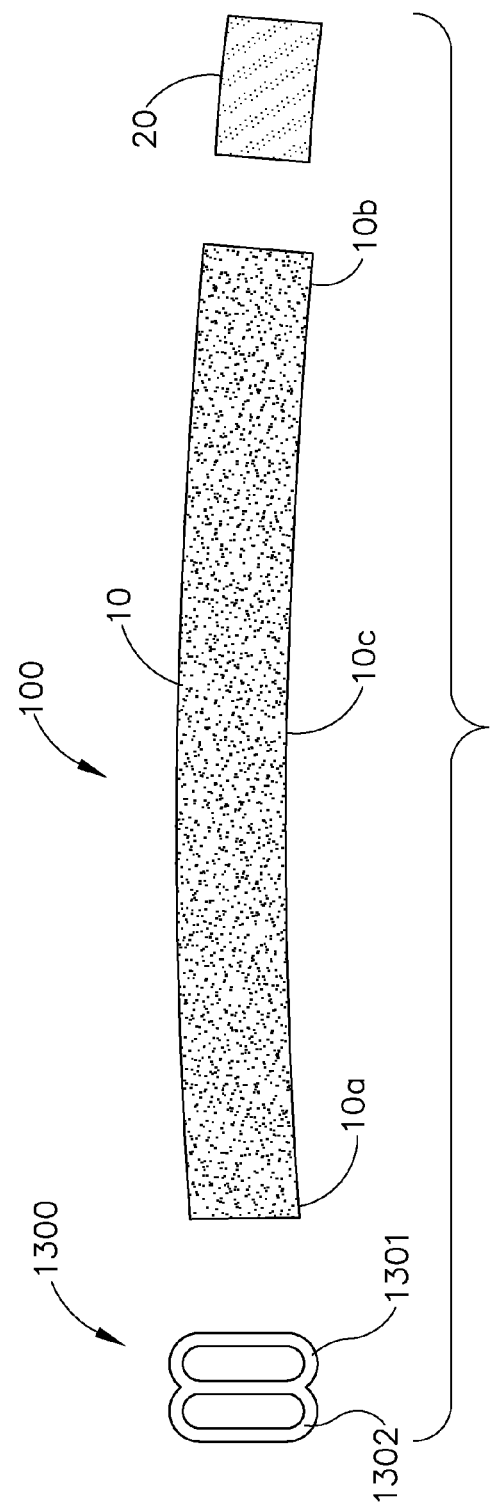
FIG. 13 is a top plan exploded view of the leash accessory assembly of FIG. 12.
Figure 14:
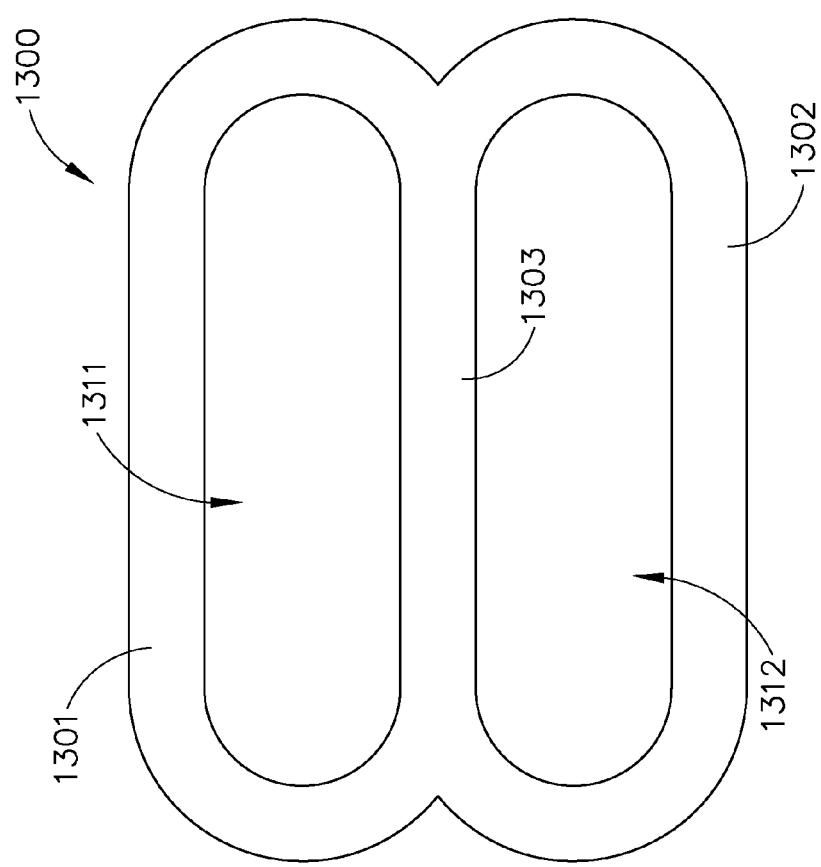
FIG. 14 is a top plan view of a leash fastener of the leash accessory assembly of FIG. 12.

FIGS. 12-13 show another alternative embodiment of a leash accessory assembly 100 that is similar to the leash accessory assembly described above, except that the leash accessory assembly shown in FIGS. 12-13 comprises an alternative embodiment of a leash fastener 1300. As best seen in FIG. 14, the leash fastener 1300 has a "figure 8" configuration such that the leash fastener 1300 comprises a wire having a first terminal portion 1301, a second terminal portion 1302, and an intermediate terminal portion 1303. The leash fastener 1300 defines a first slot 1311 between the first terminal portion 1301 and the intermediate terminal portion 1303. The leash fastener 1300 further defines a second slot 1312 between the second terminal portion 1302 and the intermediate terminal portion 1303. Of course, other suitable dimensions or configurations for the leash fastener 1300 will be apparent to one with ordinary skill in the art in view of the teachings herein.

Figure 15:
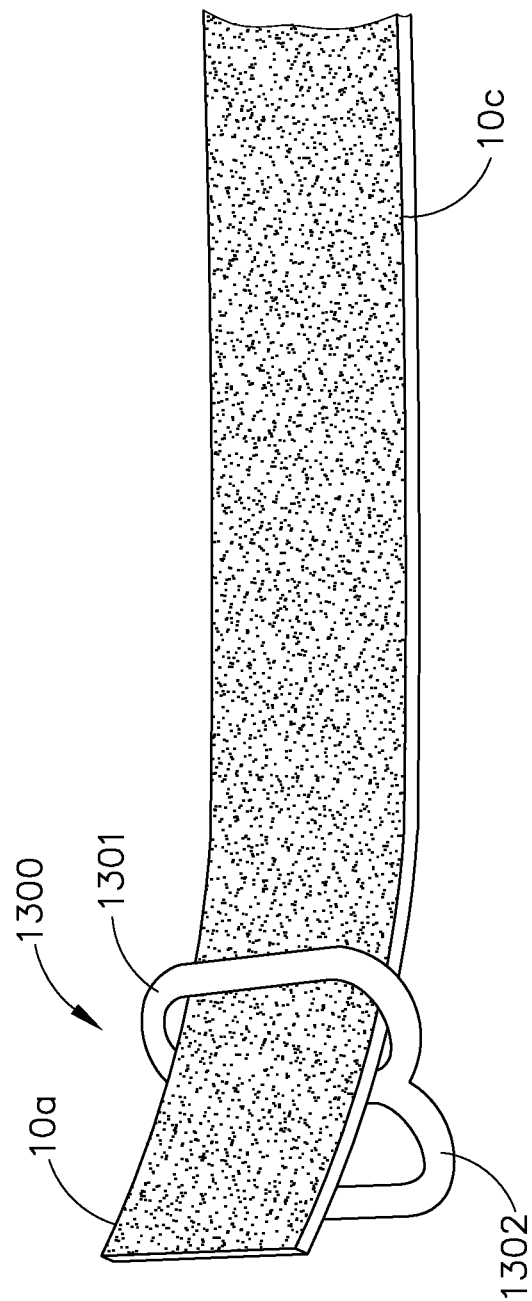
FIG. 15 is a top perspective view of a strap of the leash accessory assembly of FIG. 12 being coupled with the leash fastener.
Figure 16:
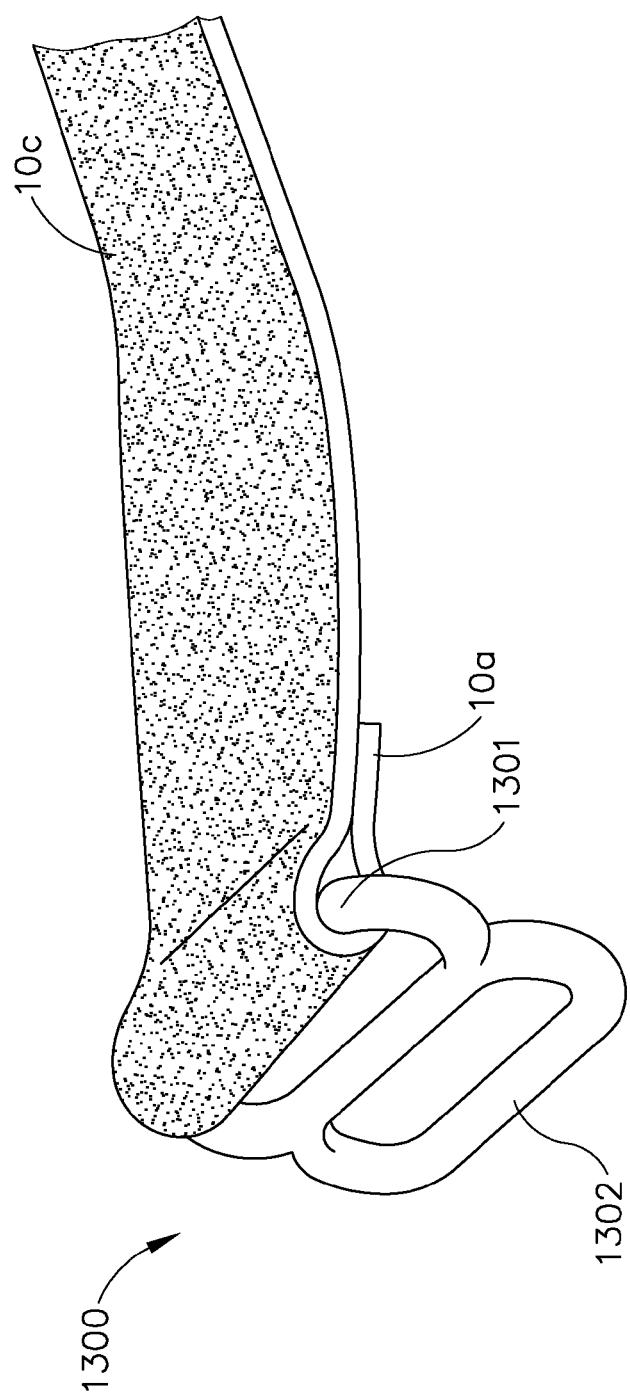
FIG. 16 is a bottom perspective view of the strap of FIG. 15 coupled with the leash fastener.

Referring now to FIGS. 15-16, the leash fastener 1300 may be secured to the first end 10*a* of the flexible strap 10 by inserting the first end 10*a* of the flexible strap 10 through the first slot 1311 and looping the first end 10*a* of the flexible strap 10 around the first terminal portion 1301 of the leash fastener 1300 (FIG. 15). The first end 10a of the flexible strap 10 is then fastened to an intermediate portion 10c of the flexible strap 10 (FIG. 16). The first end 10a of the strap 10 may then be secured to the intermediate portion 10c of the strap 10 to maintain the position of the leash fastener 1300 relative to the strap 10. The first end 10a may be secured by any suitable means. Non-limiting means may be selected from the group of being: sewn on; glued on; welded on, e.g. by plastic welding; and combinations thereof.

Figure 17A:
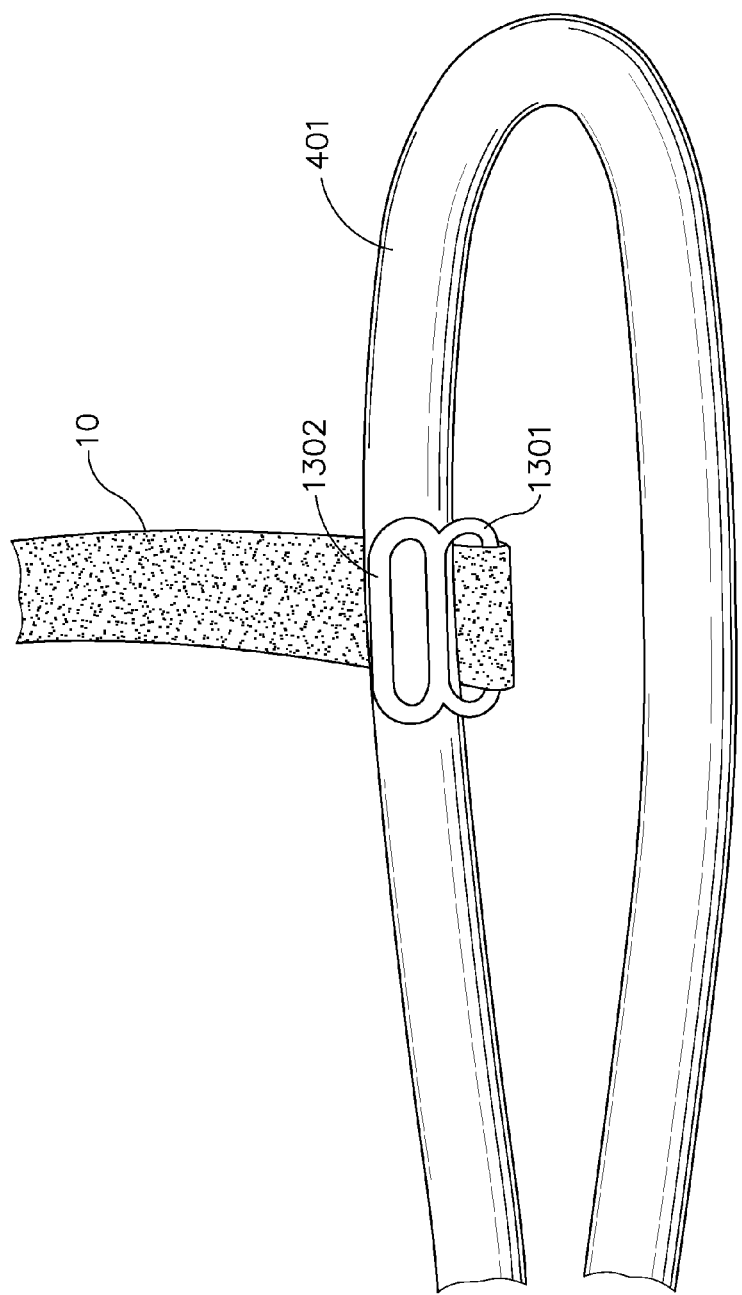
FIG. 17A is a top perspective view of the leash accessory assembly of FIG. 12 being coupled with a leash, showing the leash positioned adjacent to the leash fastener.
Figure 17C:
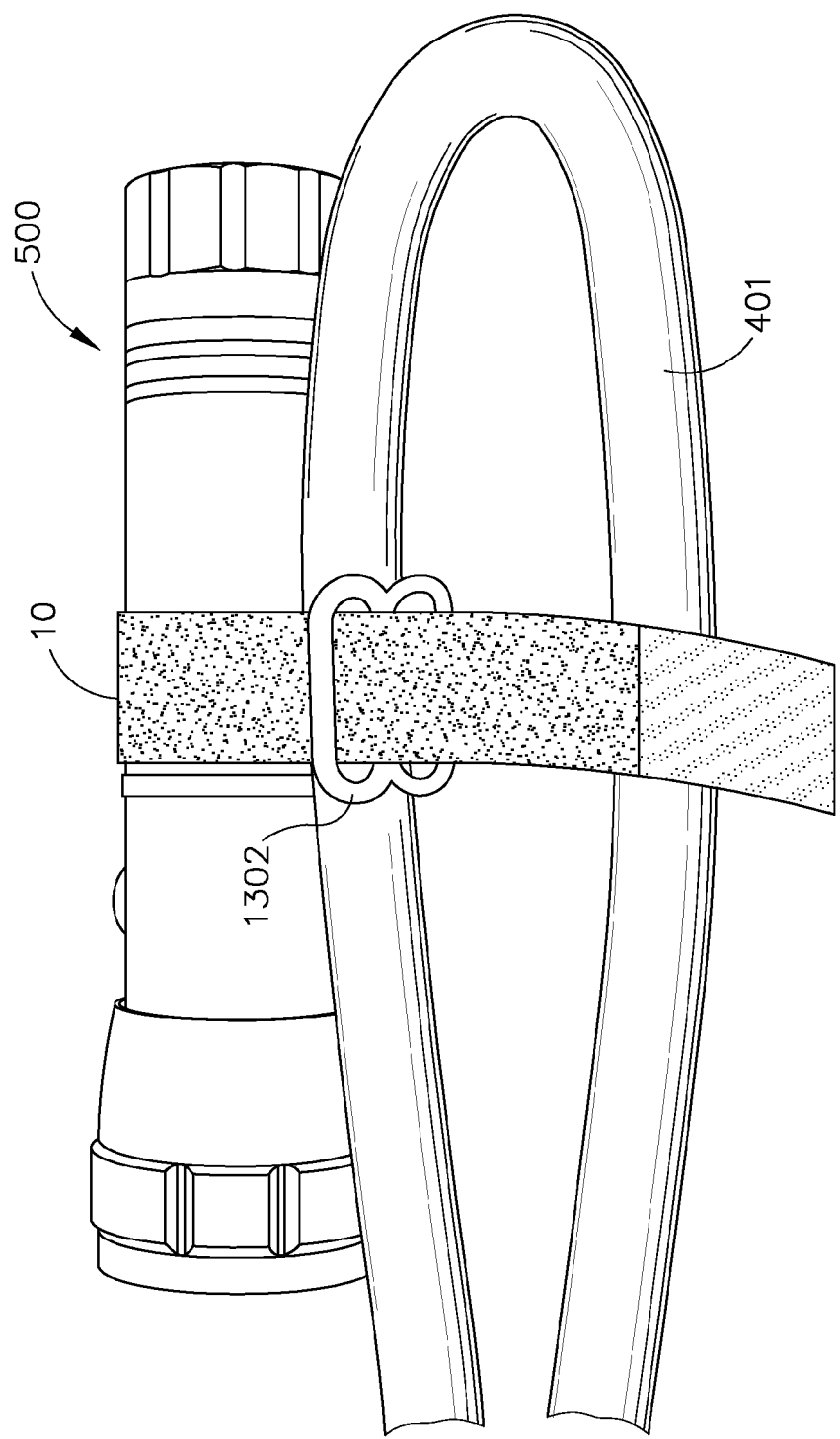
FIG. 17C is a top perspective view of the leash accessory assembly of FIG. 17A, showing the strap inserted within the leash fastener.
Figure 17D:
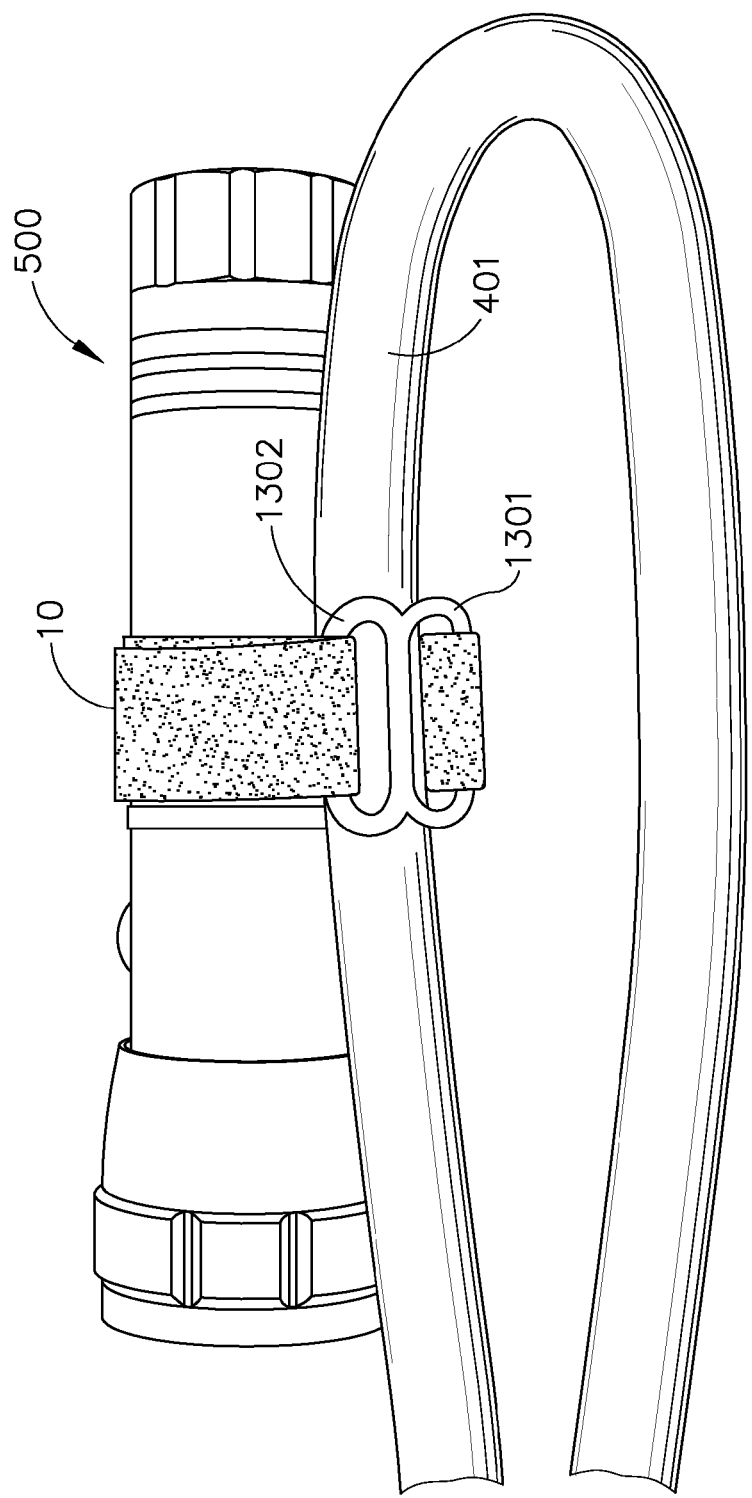
FIG. 17D is a top perspective view of the leash accessory assembly of FIG. 17A, showing the leash accessory assembly coupled with the leash accessory.

Referring now to FIGS. 17A-17D, deployment of the leash accessory assembly 100 to attach a leash accessory 500, such as an off-the-shelf flashlight, to the handle 401 of a leash 400 is shown. As shown in FIG. 17A, the handle 401 of the leash 400 is positioned adjacent to the leash fastener 1300 on a first side of the intermediate portion 10c of the strap 10. The leash accessory 500 is then placed adjacent to the handle 401 of the leash 400 on the first side of the intermediate portion 10c of the flexible strap 10, as shown in FIG. 17B. Referencing FIG. 17D, the flexible strap 10 is wrapped around the leash accessory 500 and the second opposing end 10b of the strap 10 is inserted within the second slot 1312 of the leash fastener 1300. The second opposing end 10b of the strap 10 is then looped around the second terminal portion 1302 and fastened to a second side of the intermediate portion 10c of the strap 10 with strap fastener 20. As shown in FIG. 17D, the leash accessory 500 is now secured to the handle 401 of the leash 400 such that its user may guide the light emitted from the flashlight 500 and maintain control of the pet attached to the other end of the leash using a single hand. As described above, other leash accessories 500 may be attached to the leash 400.

Figure 18:
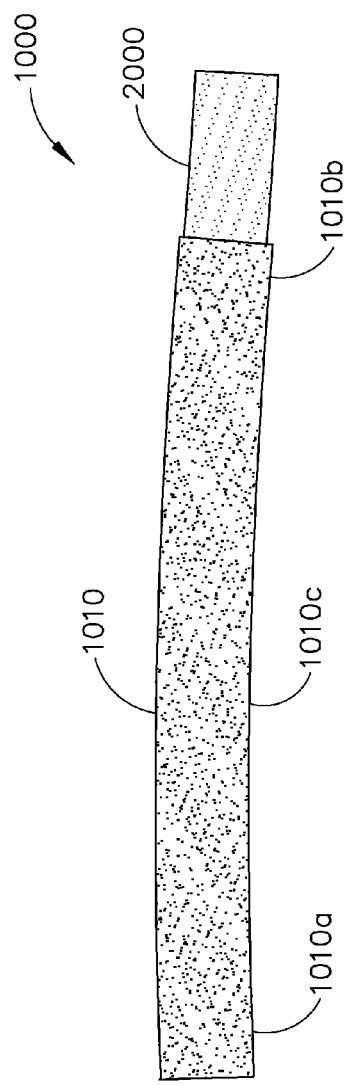
FIG. 18 is a top plan view of another embodiment of a leash accessory assembly in an open configuration.
Figure 19:
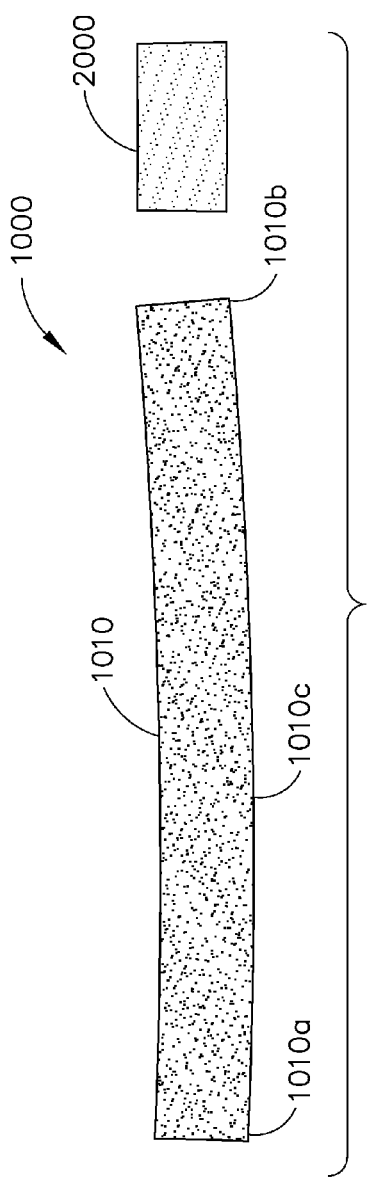
FIG. 19 is a top plan exploded view of the leash accessory assembly of FIG. 18.
Figure 20B:
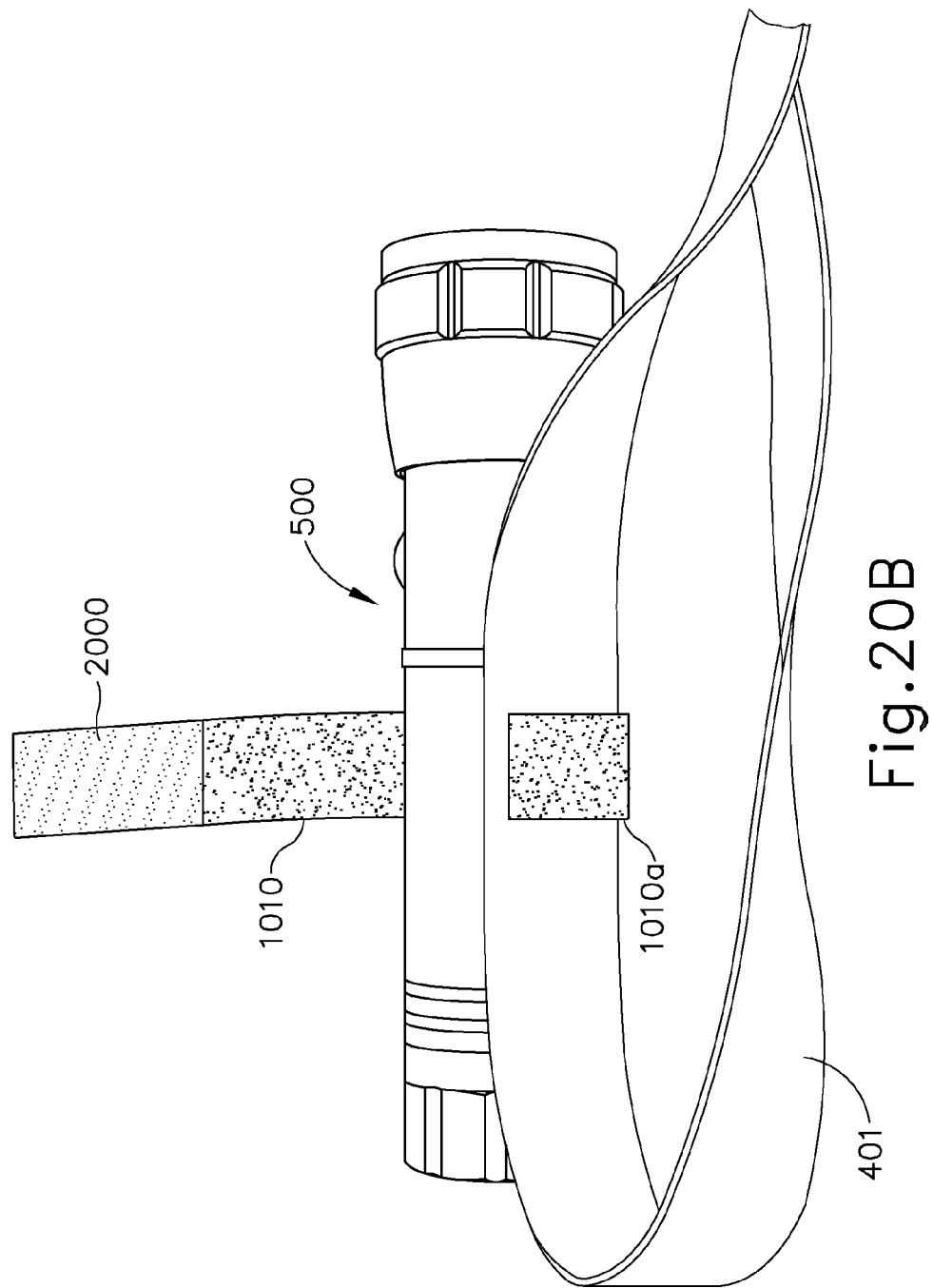
FIG. 20B is a top perspective view of the leash accessory assembly of FIG. 20A, showing a leash accessory positioned within the leash accessory assembly.
Figure 20C:
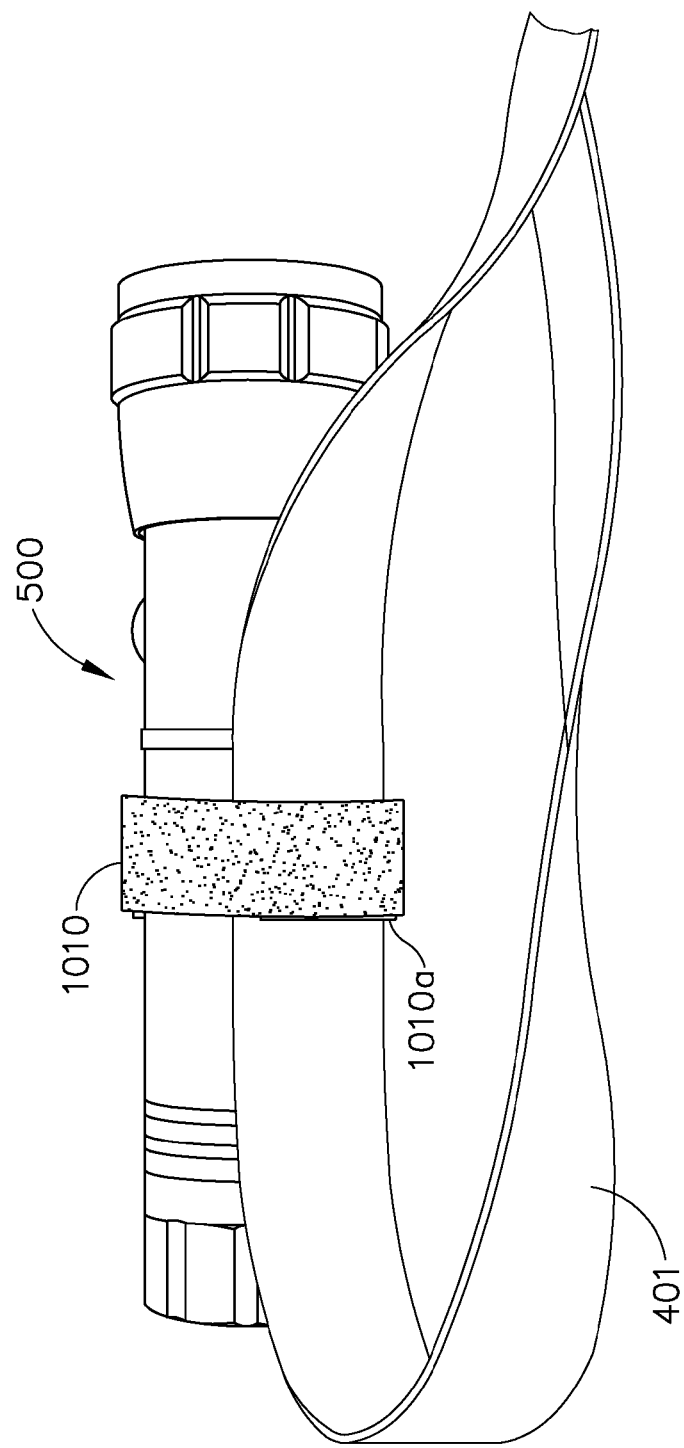
FIG. 20C is a top perspective view of the leash accessory assembly of FIG. 20A, showing the leash accessory assembly coupled with the leash accessory.

In some embodiments, the leash fastener 200, 1200, 2200, 1300 is integral with the strap 10. For instance, FIGS. 18-19 show another alternative embodiment of a leash accessory assembly 1000 that is similar to the leash accessory assembly 100, except that the first end 1010a of the strap 1010 is used as the leash fastener. Referring now to FIGS. 20A-20C, deployment of the leash accessory assembly 1000 to attach a leash accessory 500, such as an off-the-shelf flashlight, to the handle 401 of a leash 400 is shown. As shown in FIG. 20A, the first end 1010a of the strap 1010 is attached to the handle 401 of the leash. The first end 1010a of the strap 1010 may be affixed to portions of the leash 400 using any suitable means. Non-limiting means may be selected from the group of being: sewn on; glued on; welded on, e.g. by plastic welding; and combinations thereof.

The leash accessory 500 is then placed adjacent to the handle 401 of the leash 400 on the first side of the intermediate portion 1010c of the flexible strap 1010, as shown in FIG. 20B. Referencing FIG. 20C, the flexible strap 1010 is wrapped around the leash accessory 500, over the first end 1010a, and the second opposing end 1010b of the strap is fastened to a second side of the intermediate portion 1010c of the strap 1010 with strap fastener 2000. As shown in FIG. 20C, the leash accessory 500 is now secured to the handle 401 of the leash 400 such that its user may guide the light emitted from the flashlight 500 and maintain control of the pet attached to the other end of the leash using a single hand.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of any claims that may be presented and is understood not to be limited to the details of structure and operation shown and described in the specification and drawings.

What is claimed is:

1. A method for operating a leash accessory assembly to selectively couple a leash accessory with a leash, wherein the leash accessory assembly comprises a flexible strap comprising a first end, a second end, and an intermediate portion extending between the first and second ends, a leash fastener coupled with the first end of the flexible strap, and a strap fastener coupled with the second end of the flexible strap, the method comprising the steps of:
   (a) positioning the leash fastener adjacent to the leash such that the leash is positioned on a first surface of the intermediate portion of the flexible strap;
   (b) positioning the leash accessory adjacent to the leash fastener on the first surface of the flexible strap;
   (c) wrapping the flexible strap around the leash accessory; and
   (d) fastening the strap fastener to a second, opposing surface of the flexible strap.

2. The method of claim 1, wherein positioning the leash fastener adjacent to the leash comprises inserting the leash between a first terminal end and a second terminal end of the leash fastener.

3. The method of claim 1, wherein wrapping the flexible strap around the leash accessory further comprises wrapping the flexible strap around the leash fastener.

4. The method of claim 1, wherein the second end of the flexible strap is inserted within a slot of the leash fastener.

5. The method of claim 1, wherein the leash accessory assembly selectively couples the leash accessory to a handle of the leash.

6. The method of claim 1, wherein the leash accessory assembly selectively couples the leash accessory to a strap of the leash.

* * * * *